(12) United States Patent
Lalwani et al.

(10) Patent No.: US 12,136,066 B2
(45) Date of Patent: Nov. 5, 2024

(54) SYSTEMS AND METHODS FOR INTEGRATING COMPUTER APPLICATIONS

(71) Applicants: ATLASSIAN PTY LTD., Sydney (AU); ATLASSIAN US, INC., San Francisco, CA (US)

(72) Inventors: Akash Lalwani, Karnataka (IN); Kritika Bahl, Karnataka (IN); Amaresh Dhar Dwivedi, Karnataka (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 93 days.

(21) Appl. No.: 17/654,357

(22) Filed: Mar. 10, 2022

(65) Prior Publication Data

US 2023/0316229 A1    Oct. 5, 2023

(51) Int. Cl.
| | |
|---|---|
| H04L 67/60 | (2022.01) |
| G06Q 10/10 | (2023.01) |
| H04L 9/40 | (2022.01) |
| H04L 67/02 | (2022.01) |
| H04L 67/51 | (2022.01) |

(52) U.S. Cl.
CPC .......... *G06Q 10/103* (2013.01); *H04L 63/10* (2013.01); *H04L 67/60* (2022.05); *H04L 67/02* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 8,555,200 B2 * | 10/2013 | Hicks | G06F 16/958 715/810 |
| 10,783,518 B1 * | 9/2020 | Pearce | G06Q 20/401 |
| 11,044,348 B1 | 6/2021 | Cannon-Brookes et al. | |
| 2008/0059897 A1 * | 3/2008 | DiLorenzo | G06F 16/9536 715/764 |

(Continued)

FOREIGN PATENT DOCUMENTS

| | | | |
|---|---|---|---|
| WO | 2006/034476 A1 | 3/2006 | |
| WO | WO-2014075510 A1 * | 5/2014 | ......... G06F 16/9562 |
| WO | WO-2016033765 A1 * | 3/2016 | ............. G06F 11/36 |

*Primary Examiner* — Dhairya A Patel
*Assistant Examiner* — Sandarva Khanal
(74) *Attorney, Agent, or Firm* — ALSTON & BIRD LLP

(57) ABSTRACT

Methods, systems, and computer readable medium for adding a label to page hosted by a secondary product platform from a client associated with a primary product platform independent of the secondary product platform are disclosed. The method include receiving, at a primary product server, from a primary client associated with the primary product server, a label request associated with a page hosted by a secondary product server; generating and communicating to the secondary product server, independent from the primary product server, a request for label data associated with the page; receiving one or more labels associated with the page from the secondary product server; and communicating the received one or more labels to the primary client for display in a user interface that includes a main panel displaying the page hosted by the secondary product server and a label panel displaying the one or more labels.

17 Claims, 15 Drawing Sheets

(56) References Cited

U.S. PATENT DOCUMENTS

| | | |
|---|---|---|
| 2009/0271847 A1 | 10/2009 | Karjala et al. |
| 2009/0276324 A1* | 11/2009 | Rothschild ......... G06Q 30/0603 |
| | | 705/26.1 |
| 2011/0191381 A1* | 8/2011 | Zheng .................. G06F 16/958 |
| | | 707/E17.022 |
| 2015/0324600 A1* | 11/2015 | Sethi ................... G06F 21/6218 |
| | | 726/27 |
| 2016/0005075 A1* | 1/2016 | Rosenshine ........... H04L 67/535 |
| | | 705/14.53 |
| 2016/0182672 A1* | 6/2016 | Kuperman .......... G06F 16/9574 |
| | | 709/213 |
| 2017/0054726 A1 | 2/2017 | Friedmann |
| 2018/0091546 A1* | 3/2018 | Davidson ............ H04L 63/1425 |
| 2019/0124031 A1* | 4/2019 | Trudeau ................. H04L 63/00 |
| 2019/0236292 A1 | 8/2019 | Bartolotta et al. |
| 2020/0153818 A1 | 5/2020 | Chauhan |
| 2020/0202181 A1* | 6/2020 | Yadav .................... G06F 16/35 |
| 2021/0103649 A1* | 4/2021 | Korus ................... G06F 9/4881 |
| 2021/0200943 A1* | 7/2021 | Aviyam ................ G06F 16/953 |
| 2021/0241357 A1 | 8/2021 | Fursman |

* cited by examiner

Fig. 9

SYSTEMS AND METHODS FOR INTEGRATING COMPUTER APPLICATIONS

TECHNICAL FIELD

Aspects of the present disclosure are directed to computer applications and more particularly to integrating independent computer applications to provide a common frontend.

BACKGROUND

Typically computer applications are created to offer specific features to users. For example, one computer application may be developed to provide an online real time chat service whereas another computer application may be developed to deliver another service, such as online collaboration for projects. Over time, many developments may be made in both computer applications as they grow and each computer application may have a rich and complex backend system that supports the corresponding computer application.

Over time, situations may arise where it might be beneficial to integrate the features of one of the computer application with features offered by the other computer application—e.g., it might be beneficial to offer the real time chat service of the first computer application to the online collaboration service offered by the second computer application or vice versa.

However, the two computer applications are often developed by different parties, totally independently and without any regard to the possible future integration with other computer applications. Therefore, the process of integrating two existing computer applications often involves solving numerous technical compatibility issues in order for the existing products to function together in a relatively cohesive fashion. In such cases, it might be possible to develop the features offered by the first computer application into the second computer application. However this may be too computationally expensive, may require many man hours to accomplish and even then, the newly developed features may not be able to replicate the quality of the features offered by the first computer application (which has been refined over time).

Accordingly, there exists a need for simpler, more efficient mechanism for introducing the features of an external computer application in a given computer application.

SUMMARY

Example embodiments described herein are directed to a computer-implemented method. The method includes receiving, at a primary product server, from a primary client associated with the primary product server, a label request associated with a page hosted by a secondary product server; generating and communicating to the secondary product server, independent from the primary product server, a request for label data associated with the page and receiving one or more labels associated with the page from the secondary product server. The method further includes communicating the received one or more labels to the primary client for display in a user interface that includes a main panel displaying the page hosted by the secondary product server and a label panel displaying the one or more labels.

Some example embodiments are directed to a system. The system includes a processor and a non-transitory computer readable medium comprising instructions, which when executed by the processor, cause the system to perform the steps of the method described above.

Other example embodiments are directed to non-transitory computer readable medium which when executed by a processor causes the processor to perform the method described above.

BRIEF DESCRIPTION OF THE DRAWINGS

In the drawings:

FIG. 9 is an example user interface showing an affordance for creating an article.

Figure 1:
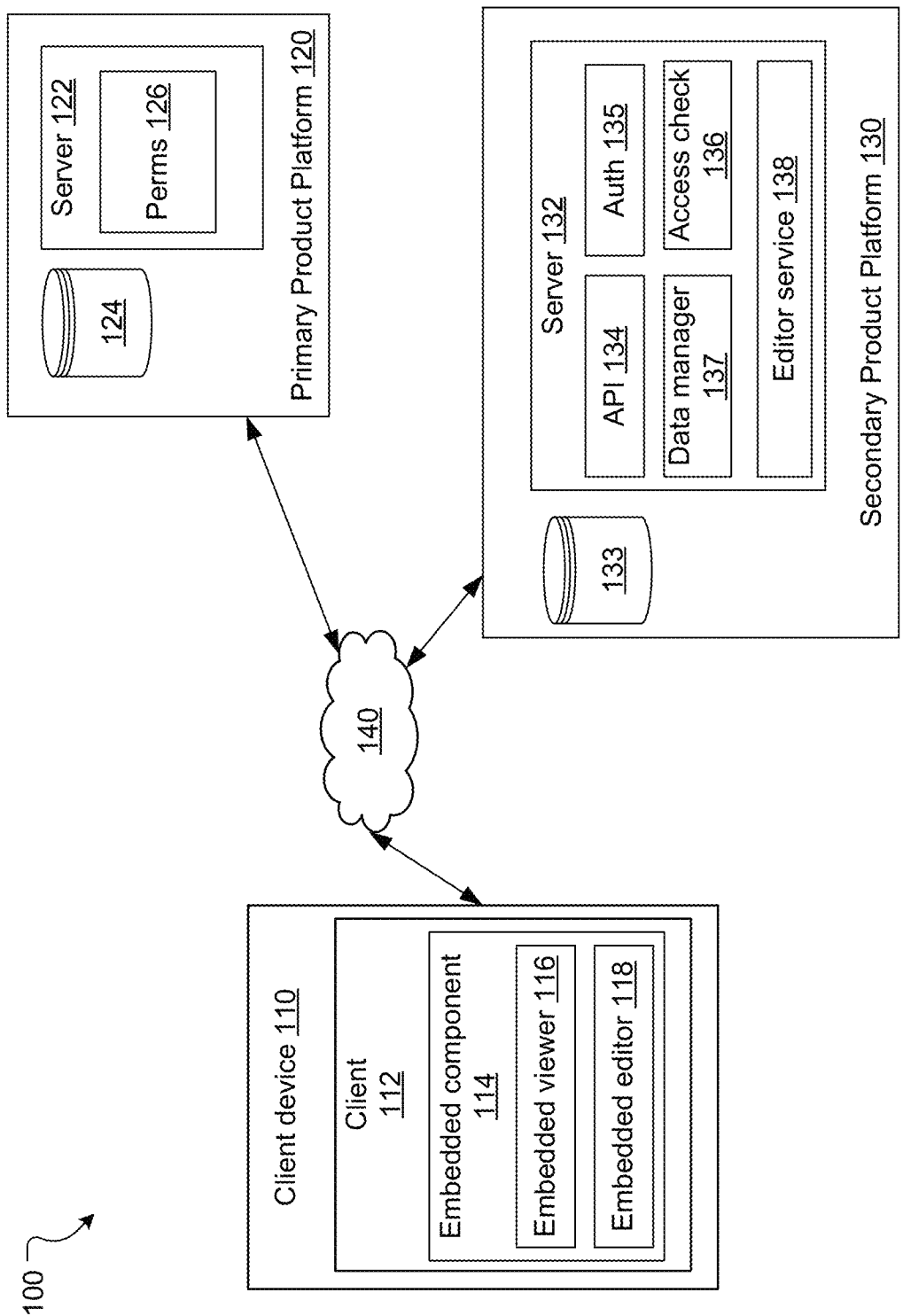
FIG. 1 is a block diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, situations may arise where it might be beneficial to incorporate the features of one computer application into another computer application. For example, consider the situation where one computer application is an issue tracking system (ITS) and another computer application is a web-based collaboration platform or corporate wiki.

Issue tracking systems are systems that manage the creation and tracking of issues or tickets in a variety of contexts. An issue is an item with associated information (e.g., a title and a brief description) and an associated workflow—i.e., a series of states through which the issue transitions over its lifecycle (e.g., pending, assigned, in process, completed).

As one example, an ITS may be deployed for use by a service helpdesk—e.g., an IT service helpdesk in a large organization. A busy service helpdesk may manage thousands, tens of thousands, or even more issues. Each issue may have a different priority, require different actions, be handled by different people, and/or be handled by multiple different people over its lifecycle. An ITS may be used to assist in managing and tracking this process. When a problem is submitted to the helpdesk, an "issue" is created and assigned (at times with a particular priority). As the issue is worked on by various users, the progress of the issue is recorded and tracked by the ITS until, ideally, the issue is resolved and closed.

As part of the service helpdesk, the ITS may wish to maintain a knowledge base—that is, e.g., a collection of documents related to the issues solved by the service helpdesk such as 'how to' documents, known bugs/problems with software, or any other such documents that may aid agents to complete tasks/issues and may help users identify possible solutions to issues even before raising issues. However, the ITS may not have developed any product features to provide such a knowledge base.

A web-based wiki system, on the other hand, provides just such a service. It allows users to create and view dynamic content pages. Further, such web-based wiki systems handle the storage, security, and permission issues associated with document creation and management.

As discussed above, the ITS can develop its own knowledge base capabilities. However it is not only difficult to introduce the features of one computer application in another computer application by developing those features from scratch, it is also very expensive to do so, consumes more computational resources, may take a very long time (sometime years) and may even result in inferior features to those offered by the other computer application.

Alternatively, the ITS may buy a license to a known wiki system and provide a link to the wiki system in the ITS user interface. This way, if the ITS users need to view or create any pages, the ITS users can visit the user interface provided by the wiki system to create/view pages. They can then embed links to the pages stored in the wiki system into their ITS to later view/edit the pages. Although this is a feasible option, it provides a very disjointed experience to users. Users have to constantly juggle between the two product platforms—which provides a rather tedious user experience. Further, customers of the ITS would also need access to the second platform to be able to view the knowledge base documents.

To overcome some of these issues, aspects of the present disclosure provide an integrated computer application that provides the functionality of two or more independent computer applications. In particular, aspects of the present disclosure provide a unified frontend (i.e., a unified experience for a user) of an integrated computer application, while maintaining the backend systems (i.e., the separate independent server systems) of the two or more computer applications as independent systems. This way, there is no need to replicate the functionalities of a computer application in another computer application or vice versa. Instead, users can interact with a unified frontend, while any requests made by the user in the frontend can be provided to the respective backend applications for fulfillment.

To this end, aspects of the present disclosure assign one of the computer applications as a primary computer application and the other computer applications can be assigned as secondary computer applications. The primary computer application is responsible for providing a unified frontend experience to the user and communicating with the secondary computer applications to update those computer applications based on actions performed by users on the unified front end and also to retrieve services/features offered by the secondary computer applications to present to the user via the unified frontend. In particular, when an organization registers with the primary computer application to access the functionality offered by the primary computer application a corresponding registration is automatically created for the organization in the secondary computer applications as well. Further, an embedded component from the secondary computer applications is installed and executed on the primary computer application. This embedded component is responsible for initiating and maintaining communications with the corresponding secondary computer application whenever a user wishes to access features made available by the corresponding secondary computer application via the primary computer application.

Aspects of the present disclosure disclose processes for view and creating objects via the primary application and updating these objects in the secondary computer applications whenever a user makes any changes in the frontend, and retrieving features/services from secondary computer applications to display in the frontend.

These and other features of the presently disclosed systems and methods will be described in detail in the following sections with reference to FIGS. 1-15. Further, it will be appreciated that features of the presently disclosed systems and methods are described time and again in this disclosure with respect to an ITS (such as Jira Service Management offered by Atlassian) as a primary computer application and a web-based wiki system (such as Confluence offered by Atlassian) as a secondary computer application. In such examples, the object created/viewed by the primary computer application is referred to as a page. However, it will be appreciated that this is merely exemplary and the described systems and methods can just as easily apply when the primary application is any other computer application that requires a knowledge base functionality.

Example System

FIG. 1 illustrates an environment 100 in which one or more aspects of the present disclosure are implemented. Specifically, FIG. 1 illustrates the systems involved in integrating two computer applications and providing a unified frontend. The systems include a client device 110, a primary product platform 120, and a secondary product platform 130. The client device and product platforms communicate with each other over one or more communication networks 140. Non-limiting examples of the environment 100 are depicted and described in U.S. patent Ser. No. 17/326,415 filed May 21, 2021, and titled "SYSTEM, METHOD, AND COMPUTER PROGRAM PRODUCT FOR IMPROVED EMBEDDED APPLICATION DATA MANAGEMENT," the contents of which are incorporated by reference herein in their entirety, for example including the first application server, second application server, user device, and interactions between components of the system depicted and described throughout.

The client device 110 may be any device suitable for performing client-side operations described herein, for example a mobile device (e.g. a tablet or mobile phone), a portable device (such as laptop computer), or any other computing device (e.g. a desktop computer).

Generally speaking, users of the client device 110 are associated with one or more user accounts and generate and/or communicate electronic content to the primary product platform 120. This activity includes any type of user account interaction with the primary product platform 120, including interaction with content and/or software applications hosted by the primary product platform 120. Example interactions include accessing/viewing and/or contributing to one or more issues hosted by the product platform 120, viewing, creating, editing one or more content pages, etc.

In order to allow users to perform these functions, as illustrated in FIG. 1, the client device 110 includes one or more client (software) applications (e.g., primary client 112) that is configured to access software applications made available by the primary product platform 120. The primary client 112 may communicate with the software application hosted by the product platform 120, render user interfaces based on instructions received from the application, and receive inputs from user accounts allowing them to interact with the application hosted by the primary product platform 120.

The primary client 112 includes instructions and data stored in the memory (e.g. non-transient compute readable media) of the client device 110 on which the application is installed/run. These instructions are executed by a processor of the client device 110 to perform various functions as described herein. By way of example, some functions performed by the primary client 112 include communicating with a primary application hosted by the primary product platform 120, rendering user interfaces based on instructions received from the primary application, and receiving inputs from users to interact with content made available by the primary product platform 120. In certain embodiments, where the primary and secondary computer applications are ITS and a wiki system, respectively, the primary client 112 renders user interfaces that show one or more pages hosted by the wiki system, allow users to create or modify such pages, view or assign issues to users, change status of issues, etc.

In addition, the primary client 112 includes libraries, components and functions that implement the features and functions of the application. In one example, the primary client 112 includes an embedded component 114 corresponding to the secondary computer application. The embedded component 114 is configured to act as an intermediary between the primary client 112 and the secondary product platform 130. In particular, the embedded component 114 requests data/services from the secondary product platform 130 on behalf of the primary application or instructs the secondary product platform 130 to update its respective object data on behalf of the primary application. Further still, the embedded component 114 is configured to establish and maintain communication with the secondary computer application whenever a user on client device 110 wishes to access content/features associated with the secondary computer application. In case the secondary computer application is a web-based collaboration/wiki system, the embedded component 114 includes an embedded viewer 116 and an embedded editor 118. The embedded viewer is configured to make calls to the collaboration system to retrieve pages for displaying in a user interface on the client device 110. The embedded editor is configured to make calls to the collaboration system to retrieve pages for editing via the client device 110. These and other features of the embedded component 114 will be described in detail with respect to FIGS. 2-15.

The primary client 112 may be implemented in various ways. For example, the primary client 112 may be a web browser application, which accesses the application hosted by the product platform 120 via appropriate uniform resource locators (URL) and communicates with the primary product platform via general world-wide-web protocols. In this case, the web browser application is configured to request, render and display user interfaces that conform to a markup language, and may be capable of internally executing browser-executable code, or other forms of code. Alternatively, the primary client 112 may be a specific application programmed to communicate with the primary product platform 120 using defined application programming interface (API) calls.

In general, each product platform 120, 130 is a system entity that hosts one or more software applications and/or content. Each product platform 120, 130 may include one or more servers (e.g., 122 and 132) for hosting corresponding software application(s) and one or more storage devices (e.g., data stores 124 and 134) for storing application specific data. Examples of software applications hosted by the primary product platform 120 may include incident management systems (e.g., OpsGenie), software code management system (e.g., Bitbucket), issue tracking applications (e.g., JIRA), web-based, Kanban-style, list-making applications (e.g., Trello). Software application hosted by the secondary product platform is a web-based collaboration wiki application (e.g., Confluence). Confluence, Trello, Jira, OpsGenie, and BitBucket are all offered by Atlassian, Inc. It will be appreciated that the software applications need not be offered by the same organization and that the presently disclosed invention can be used with any primary product application configured to interact with a web-based collaboration wiki application.

The server 122 includes one or more application programs, libraries, APIs, or other software elements that implement the features and functions of the application. The server 122 includes a permissions module 126 that is configured to check whether a user has permission to access features provided by the primary product platform 120.

The server 132 of the secondary product platform 130 may include an API module 134, an authorization module 135, an access check module 136, a data manager 137, and an editor service 138. The API module 134 is configured to provide an interface between the primary platform 120 and the other modules of the secondary platform 130. Specifically, the API module 134 allows the primary client 112 and the embedded component 114 to communicate with the authorization module 135, the access check module 136 and data manager 137 and the editor 138 over open web protocols such as (HTTPS, REST, and JWT). In some aspects the API module 134 receives requests for one or more pages stored by the secondary platform 130 and responds to such requests. The API module 134 is configured to forward these requests to the data manager 137 or editor 138 once permission checks are completed with the authorization and access check modules 135, 136. In one embodiment, the API module 134 is based on the Representational State Transfer (REST) architectural style. Alternatively, it may be based on the Simple Object Access Protocol (SOAP) architecture.

The authorization module 135 is configured to receive a permissions request from the API module 134, where the permission request may include an identifier for a secondary product platform space and/or item. The authorization module 135 returns a list of global and space permissions allowed for the given secondary product platform space and/or item. The permissions may indicate the level and type of access provided by the secondary product platform 130 for the given space and/or item. For instance, the permissions may indicate whether a given role such as administrators/agents/users have permission to create spaces.

The access check module 136 may be configured to receive a permissions request from the API module 134 for a given user and if the user is not a registered user of the secondary product platform, the access check module 136 is configured to check whether the user is associated with (or has permissions for) the primary product platform 120, the primary product platform 120 is linked with the secondary product platform 130 and the requested page is not restricted. Further, the access check module 136 is configured to determine whether the user has permission to view/edit a requested page based on the global and space permissions provided by the authorization module 135.

The data manager 137 is configured to receive requests to view/edit items or add/delete items and fulfill these requests if the requests are accompanied with the correct permissions.

The editor service 138 communicates with the embedded editor 118 to provide real time document editing features to the primary client 112. Further, the editor service may provide collaborative editing features—e.g., allowing two or more users to edit a page simultaneously.

The product platforms 120, 130 also store product data. Product data generally includes: data defining the operation of the hosted application (for example, user accounts, user permissions, and the like); and application data (i.e., the content hosted/maintained by the application, which can be, for example, issue data (in an ITS product platform), page and space data (in a collaboration/wiki system), or any other type of integrated object data. The data is stored on and managed by data stores 124, 133. Data stores 124, 133 may be provided by a database server (not shown) which may be hosted by server 122, 132, but is more typically hosted on a separate physical computer in communication (directly or indirectly via one or more networks 140) with the servers 122, 132.

While single server architecture has been described herein, it will be appreciated that one or both of the product platforms 120, 130 can be implemented using alternative architectures. For example, in certain cases a clustered architecture may be used where multiple server computing instances (or nodes) are instantiated to meet system demand. Conversely, in the case of small enterprises with relatively simple requirements a product platform 120, 130 may be a stand-alone implementation (i.e., a single computer directly accessed/used by the end user).

Further, although the editor server 138 is shown as part of the secondary product platform 130 this may not always be the case. In some examples, the editor service 138 may be an independent platform or service with its own server and data stores.

As illustrated in FIG. 1, communications between the various systems are via the communication network 140. The communication network 140 is depicted as a single network in FIG. 1 for ease of depiction. However, in actual implementation, the various systems illustrated in FIG. 1 may communicate with each other over different communication networks. For example, the product platforms 120, 130 may communicate with each other through a local area network (LAN), whereas the primary product platform 120 may communicate with the client device 110 via a public network (e.g., the Internet). Furthermore, the product platforms 120, 130 may communicate with each other over open web protocols such as (HTTPS, REST, and JWT).

As described above, primary client 112 is configured to interact with the primary product platform 120, whereas the embedded component 114 is configured to interact with the secondary product platform 130. Further, the primary and secondary product platforms 120, 130 may interact with each other in the background. In this manner, the user only needs to have a user account with the primary product platform 120 and interact with the primary product platform 120 via the primary client 112 whilst enjoying the functionalities provided by the secondary product platform 130 as well.

It will be appreciated that although only one client device 110, and one secondary product platform 130 has been depicted, in normal operation, many more client devices 110 and/or secondary product platforms 130 may be connected to the primary product platform 120 through the network 140.

The operations/techniques described herein are implemented by one or more special-purpose computing systems or devices. For example, in environment 100: the client device 110 is a computer system and the product servers 122, 132 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
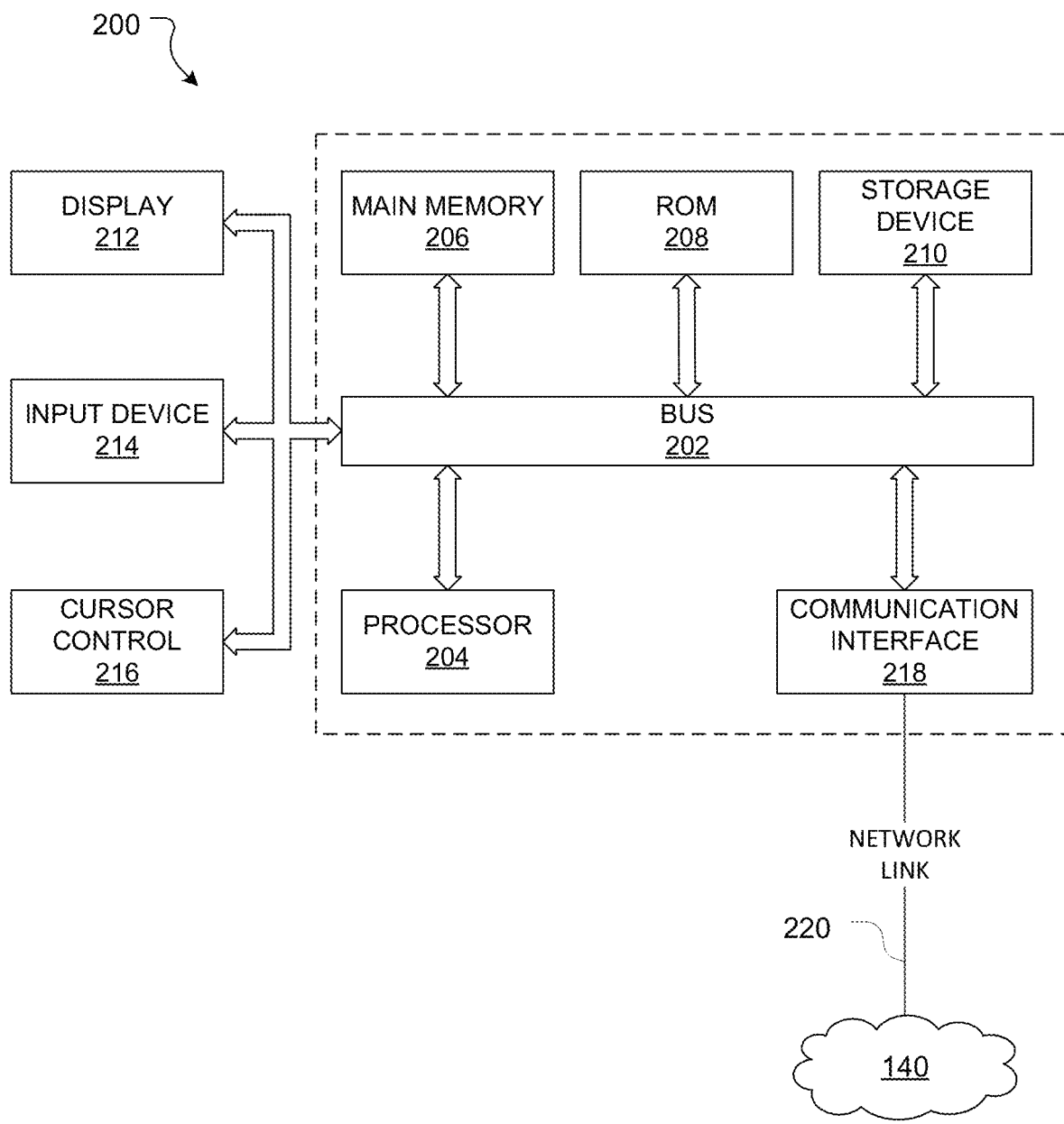
FIG. 2 is a block diagram of a computer processing system configurable to perform various features of the present disclosure.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 110, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 140. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks 360 to other computing systems. For example, if the computer system 200 is the client device 110, the network link 220 may provide a connection through network 140 to the primary product platform 120.

Computer system 200 can send messages and receive data, including program code, through the network(s), network link 220 and communication interface 218. In the above example, it may receive page data through the network 140 and communication interface 218 from the secondary product platform 130. The processor 204 executing the embedded component 114 in the client device 110 may render the received page data for display on a user interface of the client device 110.

Example Methods

Figure 7:
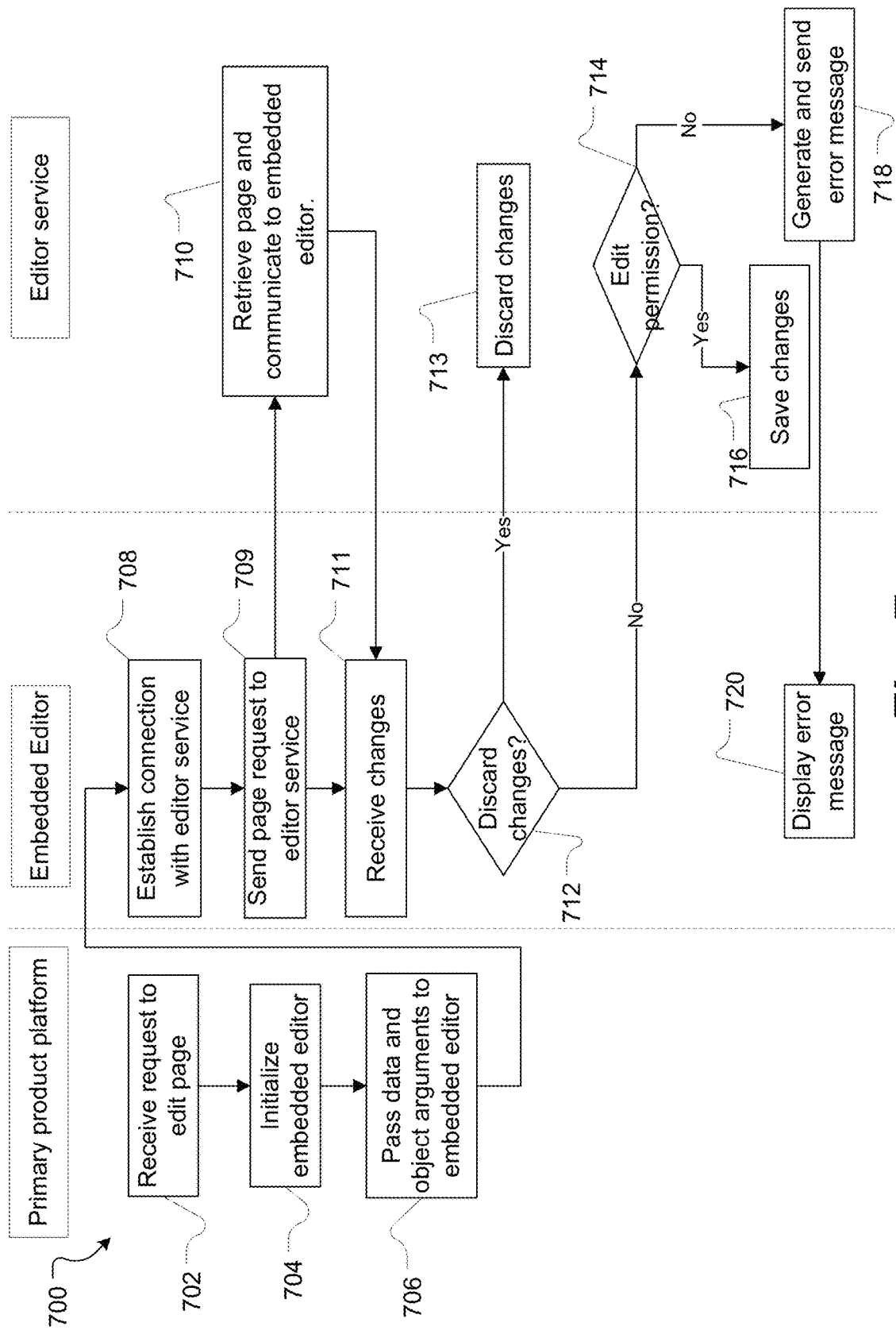
FIG. 7 is a flowchart illustrating an example method for editing a page displayed by an embedded editor of the primary client according to aspects of the present disclosure.
Figure 8:
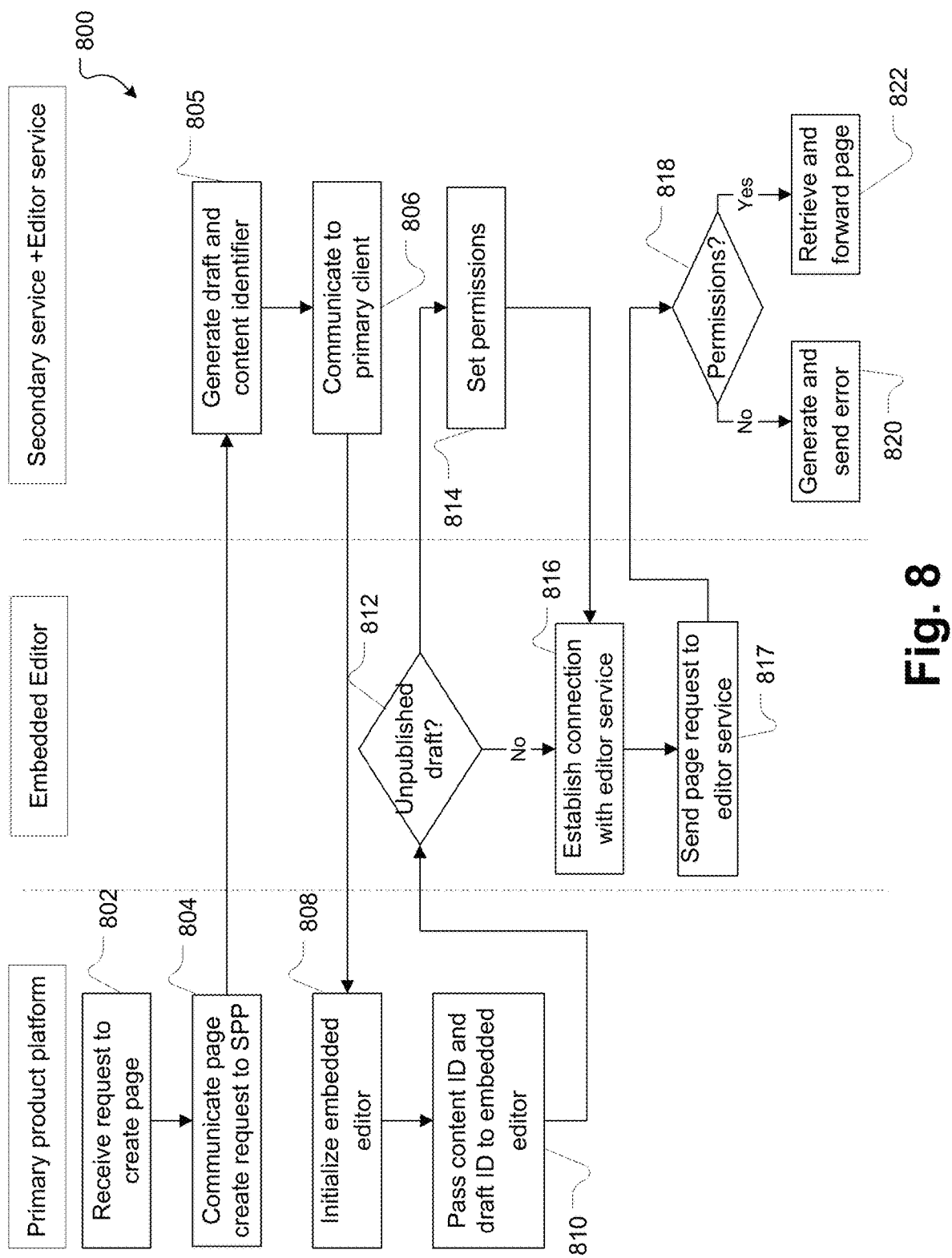
FIG. 8 is a flowchart illustrating an example method for creating a page on the primary client according to aspects of the present disclosure.
Figure 10:
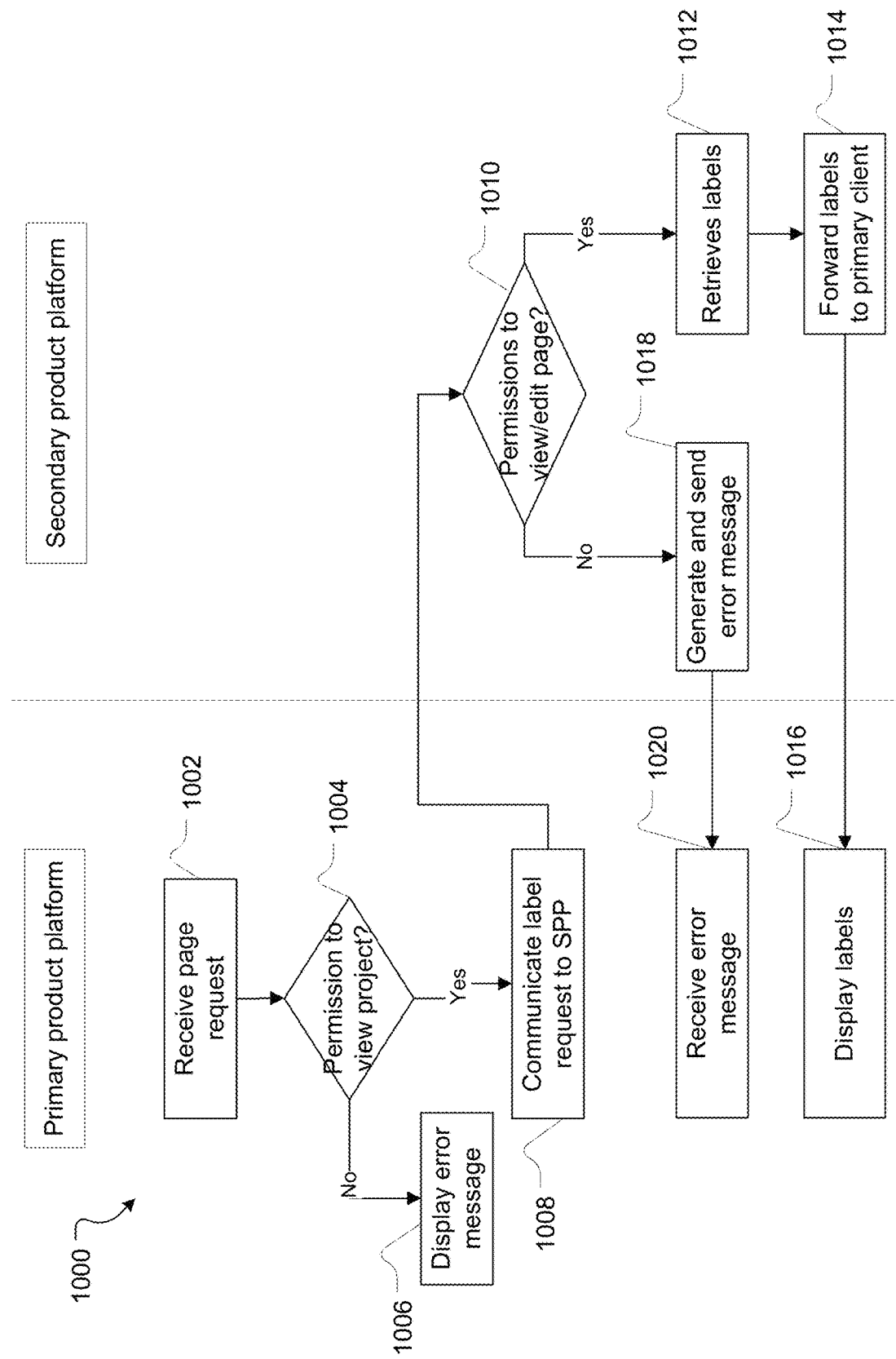
FIG. 10 is a flowchart illustrating an example method for viewing labels associated with a page on the primary client according to aspects of the present disclosure.
Figure 12:
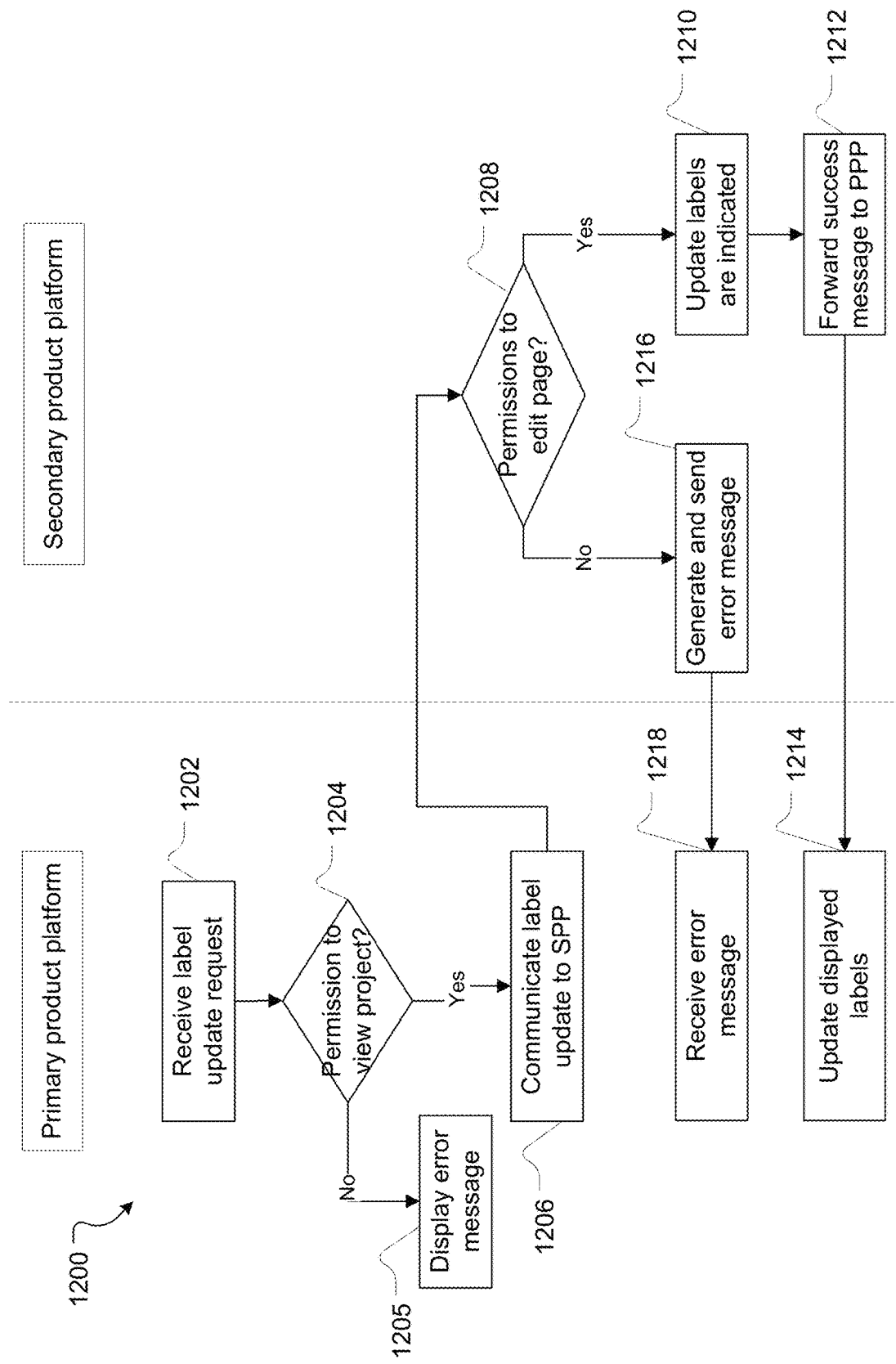
FIG. 12 is a flowchart illustrating an example method for editing labels associated with a page using the primary client according to aspects of the present disclosure.

Various methods for providing integrated wiki services via a primary product platform 120 will now be described. In particular, FIG. 3 describes a method for linking the primary and secondary product platforms 120, 130. FIGS. 4, 7, and 8 describe example methods for viewing, editing and creating an object via the primary client 112. FIGS. 10 and 12 describe methods for viewing and editing labels associated with an object via the primary client 112 and FIGS. 13-15 describe methods for determining whether a user of the primary product application has permission to view/edit/delete an object hosted by the secondary computer application.

The operations of the methods described in FIGS. 4, 7, 8, 10, 12, and 13-15 will be described as being performed by the systems (e.g., client device 110, primary product platform 120, and secondary product platform 130) described in FIG. 1. In alternative embodiments, the processing described may be performed by one or more alternative systems (operating in conjunction with systems 110-130 or independently) and/or alternative applications running on those systems.

Further, the methods disclosed herein will be described with reference to example primary and secondary product platforms. In particular, the primary product platform 120 is considered to be an ITS platform (such as Jira Service Management or JSM) that creates, updates and manages issues and the secondary product platform 130 is considered to be an online collaboration wiki system (such as Confluence®) that can be used to create and manage documents or pages.

Method for Linking the Product Platforms

Figure 3:
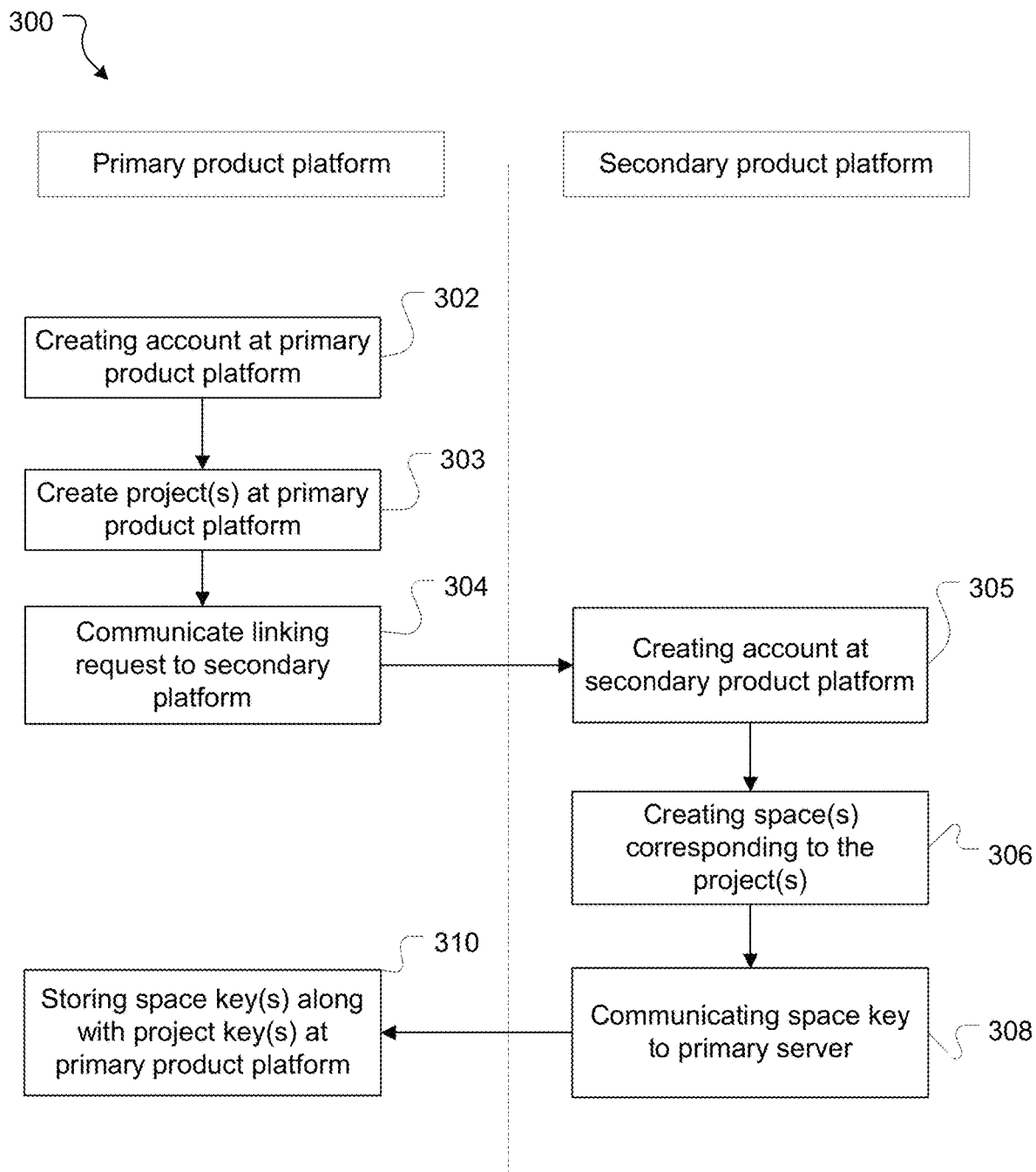
FIG. 3 is a flowchart illustrating an example method for linking primary and secondary product platforms according to aspects of the present disclosure.
Figure 4:
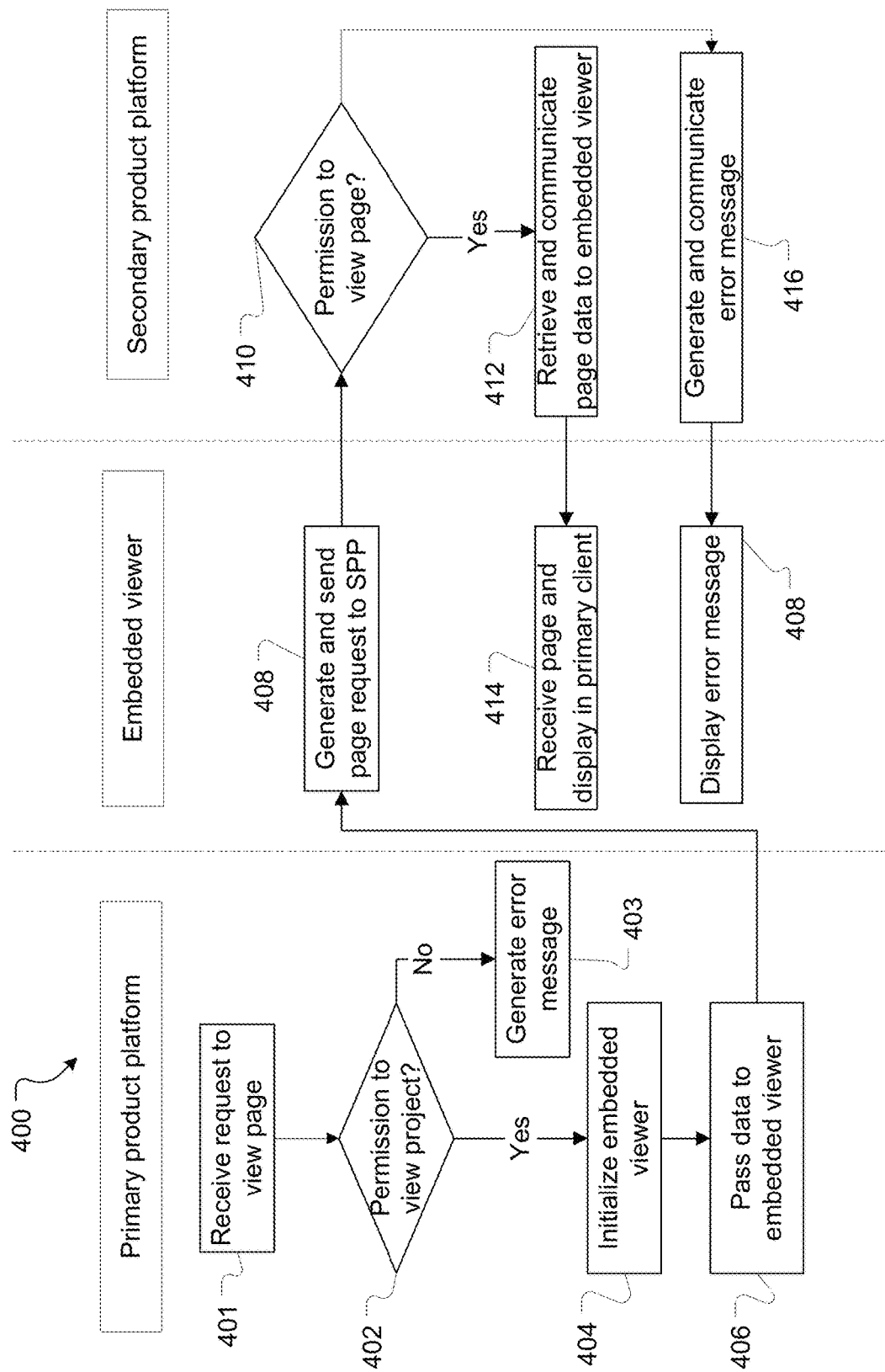
FIG. 4 is a flowchart illustrating an example method for viewing a page hosted by the secondary product platform on a primary client according to aspects of the present disclosure.

Turning to FIG. 3, method 300 commences at step 302, when an organization and in particular a user associated with an organization (e.g., an administrator) installs, executes or registers with the primary product platform 120.

For instance, the administrator may visit a website associated with the primary application, sign up, and provide user and organization details. This information is communicated to the primary server 122, which creates a new account for the organization and for employees of the organization. The administrator may provide names and details of the employees. The primary server 122 in turn may communicate with these employees and request them to register with the ITS as part of the organization account. Once the employees do this, the primary server 122 adds these employees as agents of the organization in the ITS system.

Next, the administrator creates one or more projects at the primary product platform 120 (at step 303). While or after the accounts are created, the administrator may be directed to a user interface created by the ITS application for the newly created organization account. This interface may allow the administrator to create one or more projects (e.g., containers within which all issues, items, and communications about a given theme are maintained)—that provide help to customers. Multiple projects can be created to provide each team in the organization its own project—such as customer service project, finance project, HR project, legal service project, etc.

Once the administrator has created the one or more projects, project data such as project name, associated teams of agents, organization, etc. is stored by the ITS server 122 in a relational manner to the organization account previously created.

At step 304, the primary server 122 communicates a linking request to the secondary server 132 requesting it to create a corresponding account for the organization and its agents at the secondary product platform 130. As part of the linking request, the primary server 122 provides details required for creating these accounts—such as organization name, organization ID, admin details, agent details, etc.

At step 305, the secondary server 132 creates a secondary account for the organization. This may include steps similar to those performed by the primary server 122 at step 302 to create accounts for the organization and agents at the primary platform 120.

At step 306, the secondary server 132 creates one or more spaces for corresponding one or more projects created in the primary product for the organization. A space is a container for pages and blog posts with related content. For example, if at step 302, the user creates a customer service project and an HR project, the primary server 122 communicates these project names and/or project keys to the secondary server 132, which automatically creates corresponding spaces such as a customer service space and an HR space for the organization's account it maintains. Further, the secondary product server 132 may automatically add view/edit permissions for any agents/administrators associated with the organization's primary product account to the spaces created for the organization in the secondary product platform. In one example, these permissions may replicate corresponding permissions set by the primary product platform. If an agent is associated with a given project in the primary application, the agent is given permission to view/edit the corresponding space in the secondary application.

At step 308, the secondary server 132 communicates the space keys and/or space identifiers for the created spaces to the primary server 122. At step 310, the primary product server stores the space keys and/or space identifiers in a relationship with the project keys and project identifiers. A space or project key is a short, unique identifier that forms part of the URL for that space or project whereas a space or project identifier is an identifier of the container in which the corresponding space or project is located. In one example, the project and space keys and identifiers may be stored as shown in table A below—

TABLE A

Project-Space correspondence table.

| Project Key | Project identifier | Space Key | Space identifier |
|---|---|---|---|
| HR_Management | 34726 | HR_Management | 38947 |
| IT_solutions | 49287 | IT_Solutions | 98470 |
| Customer_service | 39887 | Customer_Service | 09830 |
| ... | ... | ... | ... |

In some examples, both the primary and secondary product platforms utilize role based access control or permissions. In case of an ITS, the primary product platform 120 may have three roles—administrator, agent, and customers. Administrators have all permissions and global access to the organization's account. Agent roles may be able to view; add, edit, delete comments and issues, and view; create and manage content for the knowledge base. Customers on the other hand may be able to raise issues, track their issues, comment on their issues and read knowledge base articles. However, they might not have permission to edit knowledge base articles. Administrators and agents are considered licensed users of the primary product, whereas customers are considered unlicensed users of the primary product. When an administrator creates an account for the organization, the administrator may be allowed to add users to the account by assigning them one or more roles. The users then adopt the permissions associated with the roles they have been assigned. The permissions module 126 is configured to manage all such user permissions, which are stored in the data store 124.

Similarly, the secondary product platform 130 may have three classes of permissions—global, space and page permissions. Global permissions allows users to access the secondary product platform. Space permissions allow or restrict users from accessing a given space in the secondary product platform and page permissions allow or restrict users from accessing specific pages within spaces. Further, for each class, permissions may be further configurable. For example, a role may have permission to view a given space, but may not have permission to create, delete, or edit pages. Similarly, another role may be able to perform all these actions in a given space, but may not be allowed to add comments to pages in a space.

When the secondary product platform 130 creates a linked account for the organization at step 304 and creates the corresponding space(s) at step 306, the secondary product platform 130 may automatically assign space permissions to all licensed users of the corresponding account in the primary product platform. Within space permissions, it may automatically set permissions for all licensed users associated with the corresponding project in the primary product platform 120 to be able to view, create, edit, and delete pages. Any unlicensed users of the primary product (e.g., customers of the primary product) may be assigned permissions to view pages in the corresponding space(s). the authorization module 135 may be configured to manage these permissions, which are stored in the data store 133.

User roles may be modified over time at the primary product platform 120. That is, over time, some users may be added to the account, some users may be removed, and the roles of other users may be modified over time. Whenever this happens, the permissions module 126 communicates changes (i.e., additions, deletions or modifications) in user roles to the secondary product platform 130 so that the authorization module 135 may update its own permissions and/or roles accordingly. Similarly, over time, administrators may add or delete projects in the primary product platform 120. When this happens, in some examples, the primary product platform 120 may communicate with the secondary product platform 130 to inform the secondary product platform 130 of the change. The secondary product platform 130 may then perform appropriate steps, such as delete a corresponding space or add a new space to the organization account. In other cases, if a project is deleted by the primary product platform, the corresponding space may not be deleted. Instead, it may be maintained in spite of the corresponding project being deleted. In such cases, the space may be viewed by accessing the secondary product platform directly. In this way, the two systems, projects and spaces, and user permissions associated with the two systems can be linked.

In the method 300 described above, it is assumed that spaces are automatically created each time a project is created in the primary product platform. However, this might not always be the case. In some other embodiments, when a project is created (at step 303), the administrator may manually select an option to create a corresponding space in the secondary product platform. Selection of this option may then cause the primary product platform to communicate project information (such as project name, associated users, etc.) to the secondary product platform at step 304.

Methods for Interacting with Items Hosted by Secondary Product Platform

As described previously, FIGS. 4-9 describe methods and show exemplary screenshots for interacting with objects hosted by the secondary product platform 130. In these methods, the primary client 112 receives a request to interact with an object hosted by the secondary server 132 and the primary client 112 initializes the embedded component 114 associated with the secondary server 132. The primary client 112 also passes a content identifier of the object to the embedded component 114. The embedded component 114 in turn is configured to request the secondary server 132 to provide the object based on the content identifier, receive the object from the secondary server 132, and render the object for display in the primary client 112.

Method for Viewing a Page Hosted by the Secondary Product Platform

FIG. 4 illustrates an example method 400 for viewing an object hosted by the secondary product platform 130 from a client associated with a primary product platform 120 (e.g., primary client 112). In this example, the object is a page that is hosted by an online collaboration wiki system whereas the primary product platform is an ITS.

Figure 5:
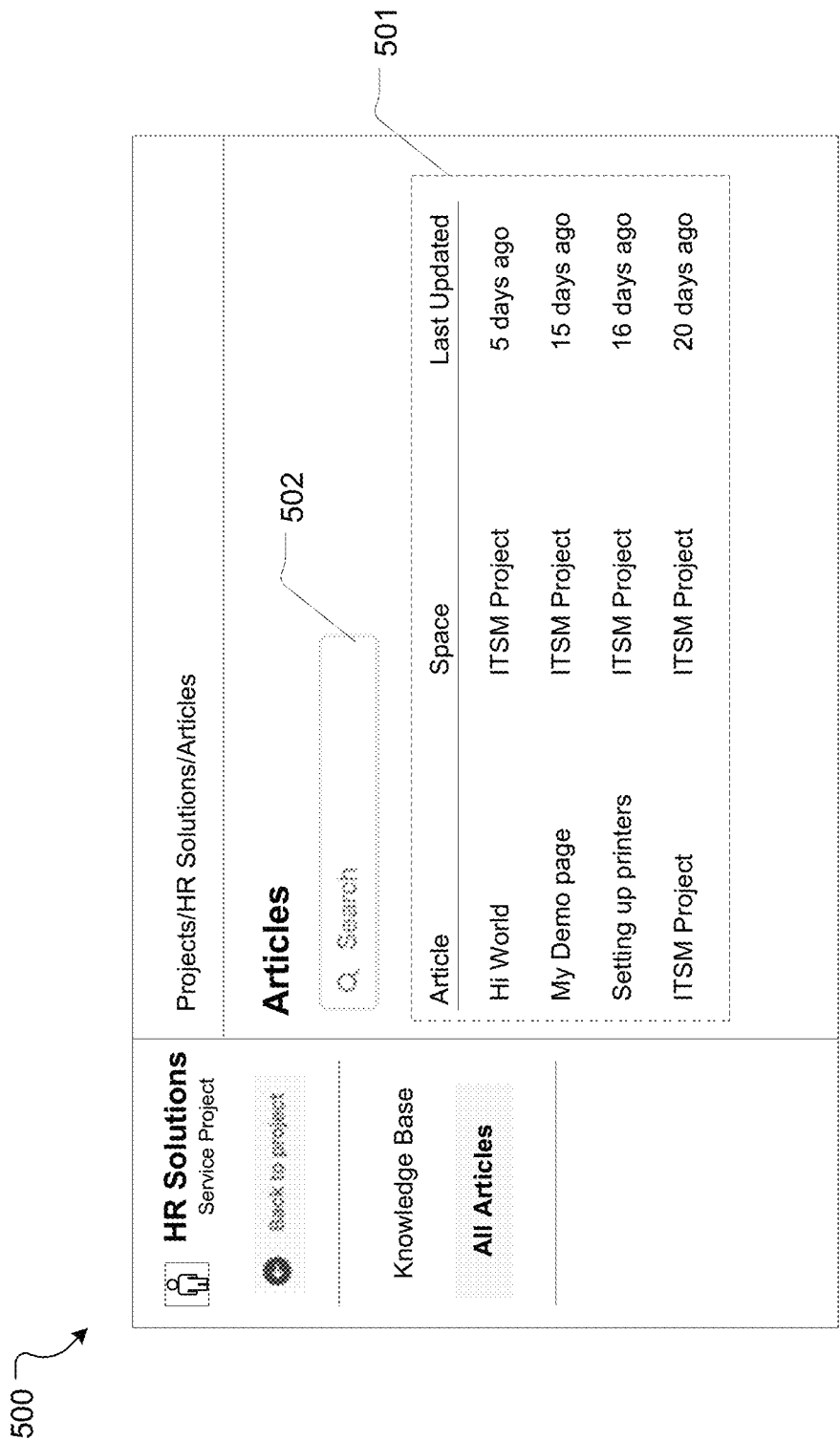
FIG. 5 is an example user interface rendered by the primary product client displaying knowledge base articles maintained by the secondary product platform.

A user (e.g., an agent or a customer) may be viewing a knowledge base catalogue associated with a given project on the client 112 on client device 110. FIG. 5 illustrates one such example user interface 500. The user interface 500 displays a list of articles 501 present in a knowledge base. The user interface 500 further includes a search bar 502 that can be used to search for articles with specific keywords. The user may select one of the article/blog names from the list 501. For example, the user may select the article/blog, 'Hike a day' from user interface 500. This selection initiates method 400. In particular, when the user selects an article/blog from the user interface, the primary client 112 generates a page request and communicates the request to the primary server 122. The page request may include an identifier of the project and an identifier of the user that made the selection.

At step 402, the primary server 122 determines whether the user has primary product permission to access the selected article/blog. In particular, at step 402, the primary server 122 determines whether the user has access to the primary product project (to which the knowledge base article belongs). The manner in which this permission check is performed is described with respect to FIG. 13 later.

If a determination is made that the user does not have primary product permission to view the selected page, the primary server 122 generates and communicates an error message to the primary client 112. At step 403 the primary client 112 receives the error message and displays a message on the client device 110 indicating that the user does not have sufficient permission to view the selected page.

Alternatively, if at step 402 it is determined that the user has the required primary product permissions to view the selected page, the primary server 122 communicates a success message to the primary client 112 along with a key of a space associated with the page. In one example, the primary server 122 may perform a lookup in table A using the project key to identify the corresponding space key.

The method 400 then proceeds to step 404 where the primary client 112 initializes the embedded viewer 116. In some cases, code for the embedded viewer 116 is passed to the primary client 112 when the user first executes the primary client 112 on the client device 110. This code or software may be installed and executed in the primary client 112 in the background while the user engages with a displayed user interface (e.g., the user interface that displays knowledge base articles). Alternatively, the code may be downloaded from the primary server 122 but may only be executed when selection of a knowledge base page is detected.

In any event, once the embedded viewer 116 is initialized at step 404, the primary client 112 passes 'props' or object arguments with data to the embedded viewer 116 at step 406. The props may include the content identifier of the selected page and the key of the corresponding space maintained by the secondary product platform 130 (received from the primary server at step 402). The primary client 112 may also communicate a user identifier of the user making the request to the embedded viewer 116. In some cases, the user identifier may be stored as a cookie on the web browser of the user device. If the embedded viewer 116 and primary client have the same domain, this cookie is passed to the embedded viewer 116 from the web browser at this step.

Next, at step 408, the embedded viewer generates and communicates a page request to the secondary product platform 130. The request includes the props passed by the primary client to the embedded viewer at step 406 (e.g., content identifier, space key, and user identifier).

Next (at step 410), the secondary product platform 130 determines whether the user has permission to view the requested space and page (e.g., based on the received content identifier, space key, and user identifier). The manner in which this determination is made is described with respect to FIGS. 14-15.

If a determination is made that the user has permission to view the requested page, the method proceeds to step 412 where the secondary product platform 130 retrieves the requested page and communicates the page to the embedded viewer 116. The embedded viewer 116 receives the page at step 414 and displays it on the client device 110.

Figure 6:
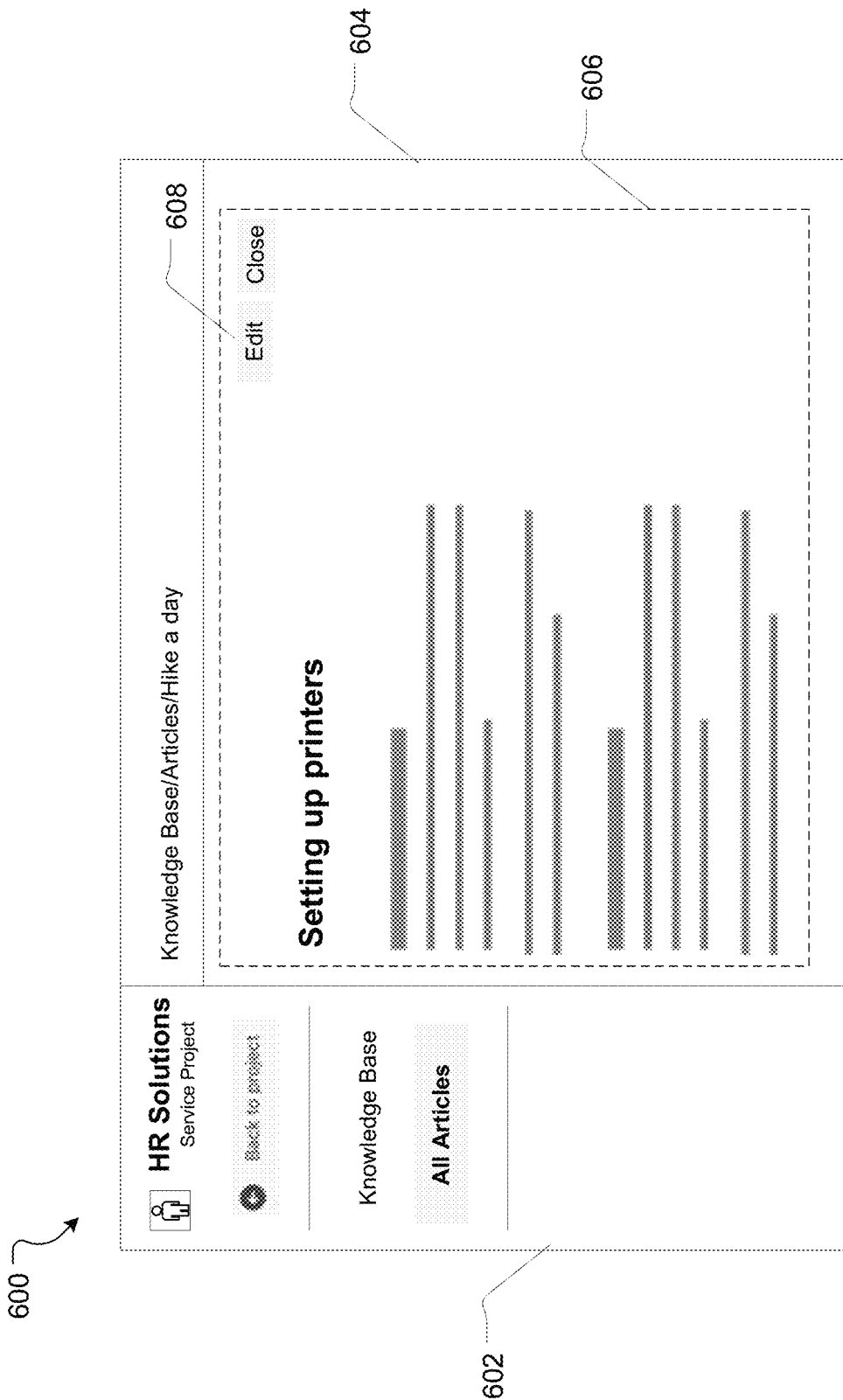
FIG. 6 is an example user interface showing the page rendered by an embedded viewer of the primary client according to aspects of the present disclosure.

FIG. 6 illustrates an example user interface 600 displayed on a client device 110 at step 414. The user interface includes a left panel 602 that shows the project name and provides an affordance to return to the project. The main panel 604 displays the retrieved article, 'Hike a day'. In some examples, the embedded viewer 116 receives the page content in the form of objects that it renders in an iFrame 606 in the main panel 604 of the user interface 600.

Alternatively, at step 410, if a determination is made that the user does not have permission to view the requested page, the method proceeds to step 416 where the secondary product platform 130 generates and communicates an error message to the embedded viewer. The embedded viewer 116 in turn receives the error message and displays an error message informing the user that the user does not have sufficient permission to view the requested page.

Method for Editing a Page

FIG. 7 illustrates an example method 700 for editing an object according to aspects of the present disclosure. Typically, a user views a page (e.g., using method 400). While viewing the page, e.g., in user interface 600, the user may wish to edit the page, e.g., to add further details, leave a comment, provide feedback, etc. To allow this editing, the user interface may include a selectable affordance, such as the edit affordance 608 shown in FIG. 6. The user can select this affordance 608 to begin editing the page.

In some examples, the edit affordance 608 may be displayed at all times (i.e., even in situations where the user viewing a page does not have permission to edit the page). In other examples, the edit affordance 608 is displayed if the user viewing the page has permission to edit the page. In such cases, in addition to checking whether the user has permission to view the project and the page (at steps 402 and 410), method 400 may also check if the user has permission to edit the project and edit the page at steps 402 and 410, respectively. If it is determined that the user has permission to edit the page, the edit affordance 608 may be displayed along with the retrieved step at step 412.

FIG. 7 is described based on the assumption that the edit affordance is displayed if the user viewing a page has the permissions to edit the page. However, it will be appreciated that the method will apply even in cases where the edit affordance is displayed irrespective of the user's permissions to edit the page. In such cases, method 700 includes additional steps to check whether the user has project edit permissions (for the primary product) and page edit permissions (for the secondary product). The method for checking edit permissions for the primary product may be similar to step 402 of FIG. 4 and may be performed in conjunction with the primary server 122 after step 702. The method for checking edit permissions for the secondary product may be similar to step 410 of FIG. 4 and may be performed before step 710.

The method 700 commences at step 702, when a user requests to edit a page, e.g., by selecting the edit affordance 608.

Next, at step 704, the embedded viewer 116 is ended and the embedded editor 118 is initialized. Initializing the embedded editor 118 is similar to initializing the embedded viewer 116.

At step 706, the embedded editor 118 is passed data and object arguments such as content identifier of the page that needs to be edited, a space key of the corresponding space and a user identifier of the user wishing to edit the page. As discussed previously, the user identifier may be obtained from a cookie stored in the client 112 and passed as part of a header message.

Once the editor 118 receives these props, it establishes a connection with the editor service 138 at step 708. The connection may be a web socket that maintains a dedicated two way communication between the embedded editor 118 and the editor service 138.

At step 709, the embedded editor 118 communicates a request to the editor service for the requested page. The request includes the page identifier and space key. It can also include the user identifier retrieved from the primary client 112.

At step 710, the editor service retrieves the requested page (based on the page identifier and space key) from the data store 133 and communicates the page to the embedded editor 118.

At step 711, the embedded editor 118 receives the page to be edited and displays this page in an iframe on the client device 110 and receives changes or edits to the page from a user of the client device 110.

In one example, the connection between the embedded editor 118 and the editor service 138 remains active while the user edits the page. This connection communicates any changes made by the user to the document in real time to the editor service 138, which keeps a track of the changes and correspondingly edits a copy of the page in real time. If a second user attempts to edit the same page at the same time, the second user's embedded editor 118 also establishes a web socket connection with the editor service 138 and provides changes in real time to the editor service 138. This way, the editor server 138 can update the underlying document in real time based on edits from both users and can communicate changes made by the first user to the embedded editor 118 of the second user and vice versa.

The embedded editor 118 provides the ability to move the cursor anywhere on the displayed page and add, edit or delete text at the selected location; add, delete or edit graphs, tables, or diagrams; add or remove attachments, etc. It also displays one or more selectable affordances on the user device to end the editing session (e.g., by accepting or discarding changes). In one example, the displayed page may include selectable affordances for 1) discarding any changes made, or 2) accepting and saving the changes (e.g., in an unpublished mode or in a published mode).

At step 712, the embedded editor 118 determines whether the user has selected any one of these affordances. In particular, at step 712 it is determined whether the user has selected an affordance to discard any changes made. If this is the case, the method proceeds to step 713 where the embedded editor 118 requests the embedded service 138 to discard any changes made by the user in the current session. The embedded service 138 discards the changes, e.g., by not saving a new version of the page in the data store 133. Once the changes are discarded, the embedded editor 118 disconnects the connection with the editor service 138 and the embedded editor 118 is ended.

Alternatively, if at this step a determination is made that the user wishes to save changes, the embedded editor 118 communicates this save request to the editor service 138. The save request may include an indication of the type of save request—e.g., whether the changes are supposed to be saved in a published mode or an unpublished mode. The method 700 proceeds to step 714 where the editor service 138 determines whether the user has permission to edit the page. In some rare cases, the permissions associated with a page may be updated while the user has the page open in editing mode on the user's client device 110. For example, from being a page with unrestricted access, the permissions of the page may change such that only the author may be able to edit the document whereas anybody with access to the space may be able to view the document. If this change happens while the user is editing the document and permissions are not freshly checked when saving the document, the edits made by the user may inadvertently be saved. To prevent this from happening, method 700 performs a permission check with the secondary product platform 130 once more before saving the edited document. To perform this check, the editor service 138 communicates a permission check to the secondary server 132 including e.g., the content identifier, the space key and the user identifier. The secondary server 132 performs the check, e.g., using method 1400-1500 and provides a response to the editor server 138.

If at step 714 the editor service 138 determines that the user has permission to edit the page, the method proceeds to step 716 where the editor service 138 saves the changes made by the user in the current session. If the save request received at step 714 indicates that the changes are to be saved in the published mode, the editor service 138 saves these changes as a new version of the page in the data store 133 along with information about the editor and the time at which the new version is created.

Alternatively if the save request received at step 714 indicates that the changes are to be saved in the unpublished form such that the changes are only visible to the author, but not to other users, the editor service 138 saves the changes made by the author in the current session as a new version in the data store 133. However, the editor service 138 may restrict access to this unpublished version of the page only to the author of the page. When the page is subsequently requested for viewing or editing by other users, the editor service 138 may retrieve the latest unrestricted/published version of the page. Alternatively, when the page is requested by the author of the restricted version of the page, the editor service 138 may retrieve the restricted/unpublished version of the page.

Method for Creating a Page

FIG. 8 illustrates an example flowchart for creating an object according to aspects of the present disclosure. In this example as well, the object is a page that is hosted by an online collaboration wiki system and the primary product platform 120 is an ITS.

Figure 9:
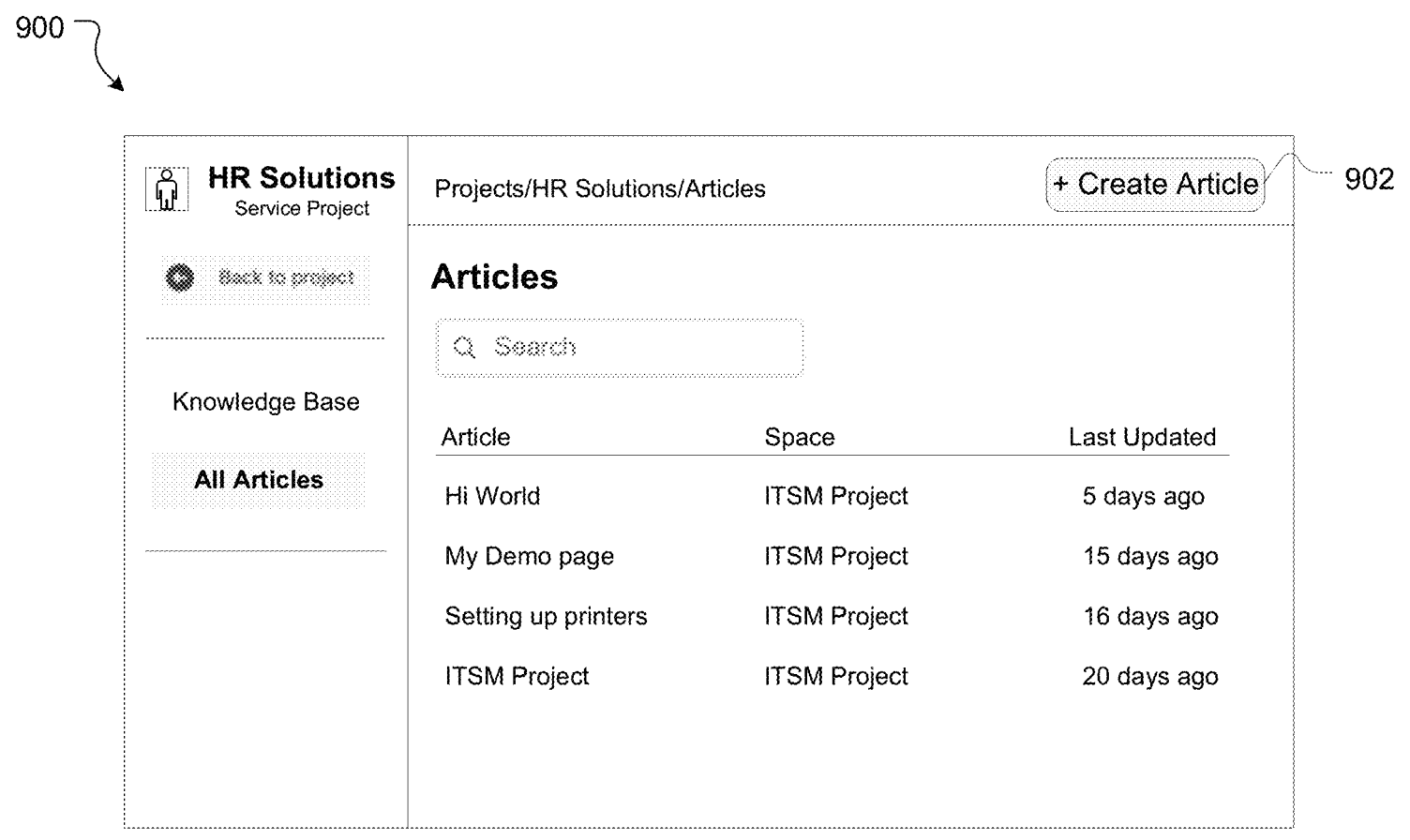

The method commences at step 802, where the primary client 112 receives a request to create a new page. A user (e.g., an agent) may be viewing a knowledge base catalogue associated with a given project on the client 312 on client device 110. The catalogue may include multiple article/blog name, titles, etc. Such a user interface is shown in FIG. 9. In addition to the articles, the user interface 900 includes an affordance 902 to create a new knowledge base article. Such an affordance may be displayed in other user interfaces associated with the ITS as well. For example, an affordance to create a new article may be displayed on an issue view user interview, in a panel, etc.

In any event, once a user requests creation of a new page, e.g., by selecting affordance 902 to create a new article, the method proceeds to step 804 where the primary client 112 communicates a page create request to the secondary product platform 130. The request may include, e.g., the space identifier of the space associated with the primary product project. In addition, if the new article is supposed to be created under another existing article (e.g., as a child page in a tree structure), the request further includes the identifier of the parent page. In one example the page create request may be communicated to a particular function such as createEmbeddedwikiContent({spaceKey, parentPageId?}) of the secondary product platform 130.

At the secondary server 132, at step 805, this function internally communicates with the data manager 137 to create a new page within the space associated with the provided space key and associated with a parent page with the corresponding parent page identifier (if provided). If no parent page identifier is provided, the data manager 137 creates the page within the space. The newly created page has a content identifier and a draft share identifier (e.g., to be used to edit unpublished drafts). The secondary product platform 130 communicates this content identifier, draft share identifier, and space key back to the primary client 112 in response to the function call at step 806.

At step 808, the primary client 112 loads or initializes the embedded editor 118. Code for the embedded editor 118 is passed to the client 312 when the primary product application is first rendered on the client device 110. This code or software may be installed and executing in the background while the user engages with the displayed user interface 900. Alternatively, the code may be downloaded from the primary server 122 but may only be executed when the user request to create a page is detected.

When the embedded editor 118 is loaded, the client passes the received content identifier, draft share identifier and space key to it at step 810. In addition the user identifier is also passed to the embedded editor at this time—e.g., in the form of a cookie in a header of the request.

Next (at step 812), the embedded editor 118 receives the props from the primary client 112 and determines whether the document to be edited is an unpublished draft. As the embedded editor 118 is a plugin component of the secondary product platform 130 it is generally unaware of the context in which it is initialized—i.e., to edit an existing document or create a new document. Instead, each time it is initialized, it performs the same function—it attempts to retrieve and display a requested document. Accordingly, at step 812, the embedded editor determines whether it is supposed to retrieve a published page or an unpublished draft from the secondary product platform. In some examples, the embedded editor 118 determines that the document is an unpublished document if it receives a draft identifier as part of the props on initialization. If it does not receive a draft identifier, it presumes the requested page is a published document.

At step 812, if the embedded editor 118 inspects the props and determines that the page is an unpublished document, it requests the secondary server 132 to set permissions for the unpublished document. To set the permissions, the embedded editor 118 communicates a permissions request to the secondary product platform (and in particular to the API module 134) along with the user identifier of the current user and the draft identifier of the page for which permissions need to be set.

At step 814, the secondary server (and in particular the authorization module 135) sets the permissions for the page. In one example, as the current user is the author of the page, the authorization module 135 sets permissions of the page such that the current user is provided complete access to the page including view/edit/delete permissions. Once the permissions are set, the authorization module 135 sends a confirmation back to the API module, which communicates the confirmation to the embedded editor 118.

The method then proceeds to step 816 where the embedded editor 118 establishes a connection with the editor service 138. The connection may be a web socket that maintains a dedicated two way communication between the embedded editor 118 and the editor service 138 while the user creates the page.

At step 817, the embedded editor 118 communicates a request to the editor service for the requested page. The request includes the content identifier, draft identifier and space key. It can also include the user identifier retrieved from the primary client 112.

Once the editor service 138 receives the page request, it performs a permission check to check if the user has permission to edit the requested page. To perform this check, the editor service 138 communicates a permission check request to the secondary server 132 including e.g., the content identifier, draft identifier, the space key and the user identifier. The secondary server 132 performs the check, e.g., using method 1400-1500 and provides a response to the editor server 138.

At step 818, if the editor service 138 determines that the user does not have permission to edit the requested page, it generates and communicates an error message to the embedded editor 118 at step 820 indicating that the user does not have permission to create a new page. Alternatively, if the editor service 138 determines that the user has permission to edit the requested page, it retrieves the page from the data manager 137 and communicates the retrieved page to the embedded editor 118 at step 822. As this is a new draft document, the retrieved page is a blank document.

Thereafter, the embedded editor 118 displays the blank document in an edit interface on the client device 110. The user may edit the document, e.g., add some text, tables, charts, attachments, etc via the embedded editor 118 (in communication with the editor service 138). Once the user has finished editing, the method becomes similar to method 700 and in particular similar to method steps 708-726.

Adding Labels

Labels are keywords or tags that can be added to knowledge base pages, blog posts, attachments, and projects. Label names can be customized and these can be used to categorize, identify or bookmark content in the knowledge base. Generally speaking, any user with permission to edit a page can add a label to a page. For example, the label 'Finance' can be assigned to finance-related pages in the knowledge base. Pages with that label can be easily searched for and displayed. Further, labels can be used to group pages and projects without requiring any restructure to the knowledge base. Further still, these are easy to add and edit, and do not affect the content of the page.

Conventionally, to add labels to a knowledge base page, a user had to visit the secondary product application, retrieve the document and add/edit labels to the document from there. Aspects of the present disclosure allow a user to view and add labels to a knowledge base page directly from the primary product application. This way, the user does not have to switch between computer applications to view or edit labels. Further, the primary product platform may maintain its own mapping of labels against request types. This may help setup article/blog suggestions that can help customers as they create a new issue/item. For example, if a user is creating a new issue request for a broken printer, the primary product platform may search the mapping for the request type, "printer problems" and retrieve articles that have "printer problems" as a label. This way, searches for articles/blogs can be conducted directly by searching the primary product data structure.

FIG. 10 illustrates an example method 1000 for viewing labels associated with a page hosted by the secondary product platform 130. In contrast to the methods for viewing/editing/creating pages that are performed via the embedded component 114 (in communication with the secondary product platform 130), the methods for viewing and/or editing labels are performed via communication between the primary client 112, primary server 122 and the secondary server 132. Further, the methods for viewing and/or editing labels may be performed simultaneously with the methods for viewing/creating/editing a page.

The method 1000 commences at step 1002, where a primary client 112 generates and communicates a label request to the primary server 122 for labels associated with a page hosted by the secondary product platform 130. In one example, this request is generated when the user selects a particular article, e.g., when a user first selects an article/blog name (e.g., Hike a day) from a list of articles 501 displayed on user interface 500. The label request may include a content identifier of the selected article, a project key of the associated primary product project, and a user identifier of the user that selected the article/blog for viewing. In this disclosure, the user making the request is sometimes referred to as a principal user.

At step 1004, the primary server 122 determines whether the user has permission to view the project (e.g., based on the user identifier and project key received from the primary client 112 as part of the label request). If it is determined that the user does not have permission to view the project, the method proceeds to step 1006, where the primary server 122 generates an error message and communicates it to the primary client 112. The method 1000 thereafter end.

Alternatively, if it is determined that the user has permission to view the project, the method proceeds to step 1008 where the primary server 122 requests the secondary product platform 130 to provide any labels associated with the article. To this end, the primary server 122 may generate and communicate a request such as—

Get Article API /wiki/rest/api/content/{id} where {id} is the content identifier of the article/blog. The request may further include a user identifier of the user making the request.

Upon receiving this request, the secondary server 132 determines whether the user has permission to view/edit the page maintained by the secondary product platform 130. In response, the secondary product platform 130 (and in particular the authorization module 135 and access checking module 136) checks whether the user has permission to view/edit the page using a method as described with respect to FIGS. 14-15. If the secondary server 132 determines that user is permitted to view the space and the page (at step 1010), the secondary server 132 retrieves any labels associated with the article/blog (based on the received content identifier) at step 1012 and communicates these labels to the primary product platform at step 1014. In one example, if labels exist for the page, the result may include an array of labels such as—

```
{
    "results": [
        {
            "prefix": "<string>",
            "name": "<string>",
            "id": "<string>",
            "label": "<string>"
        }
    ],
    "size": 2154,
}
```

In addition to the array of label names and identifiers, the response may include a field indicating the size of the labels. Further, the secondary product platform 130 may communicate an access token for the user to the primary server 122. The access token includes information to verify the user's right to access the requested page. In particular, the token includes a header including data about the token's type and the algorithm used to make it, payload that includes information about the user, including permissions and expirations, and a signature which includes verification data, so the recipient can ensure the authenticity of the token. The payload, also called a claims section. The primary server 122 stores this access token against the user identifier in its own data store and uses this access token each time the primary server 122 makes a request to the secondary server 132 to perform an action on behalf of the user (such as retrieve labels, add labels, edit labels, etc.). Once a session ends, the access token may be discarded.

Figure 11:
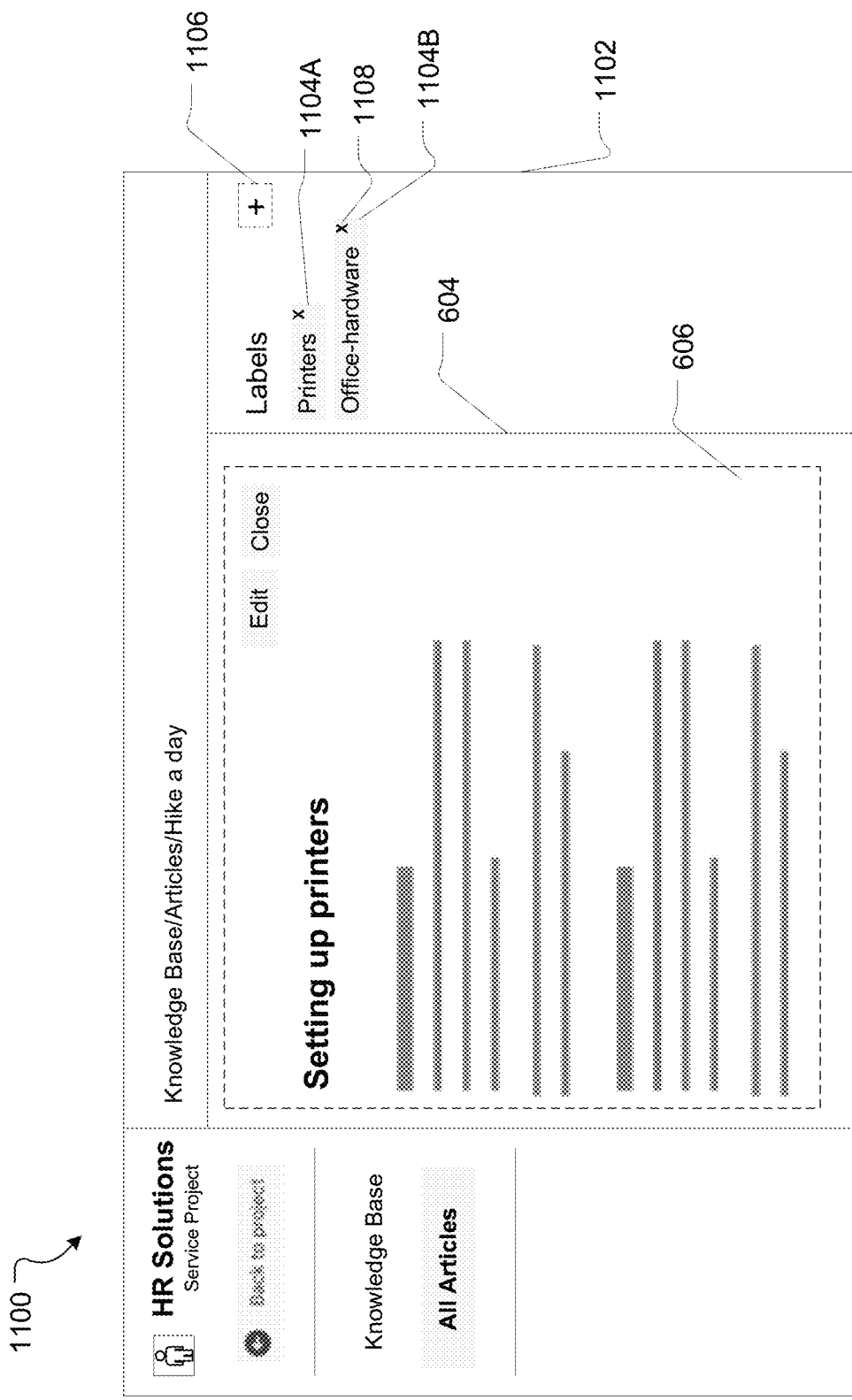
FIG. 11 is a user interface showing labels associated with a page.

At step 1016, the primary server 122 communicates the label results to the primary client 112, which displays the labels on a user interface. In one example, the labels may be displayed in a user interface similar to that shown in FIG. 6. FIG. 11 shows an example of such a user interface 1100. As seen in this figure, the user interface includes a left panel 602 and a main panel 604 (showing the request page in an iFrame 606) like the user interface 600. In addition to these elements, the user interface 1100 includes a label panel 1102 that shows labels 1104 associated with the page 'Setting up Printers". In this example, the page is associated with two labels—Printers 1104A and Office-hardware 1104B.

Returning to step 1010, if at this step the secondary server 132 determines that the principal user does not have permission to view/edit the page, the method proceeds to step 1018 where the secondary product platform 130 generates and communicates an error message to the primary server 122.

At step 1020, the primary server 122 communicates this error message to the primary client 112. In one example, in this case as the user does not have sufficient permission to view labels, no label information is displayed on the user interface 1100. As the user does not have permission to view the article/page in this case, even the embedded viewer 116 may not display the article/blog. Instead an error message may be displayed informing the user that they do not have sufficient permissions to view the article and/or labels (e.g., as displayed at step 408 of FIG. 4).

Returning to step 1010, if the secondary server 132 determines that the user has view permissions, but does not have permission to edit the page, the secondary server 132 communicates the labels to the primary server (along with the token, in some cases). The primary server 122 communicates the labels to the client 112 and the client displays the labels, e.g., in the label panel 1102. However, unlike the situation where the labels are displayed along with interactive/editable elements (such as elements 1106 and 1108) to add or delete labels, in case the user does not have edit permissions, these interactive/editable elements are not rendered or displayed on the client device 110.

Adding a Label

FIG. 12 illustrates an example method 1200 for updating a label associated with a displayed page.

As seen in user interface 1100, in case the user has permission to edit labels, the user interface 1100 displays an affordance to add new labels to the page (e.g., see the '+' affordance 1106 in user interface 1100). Further, if any labels are already associated with the page, the user interface 1100 may display affordances to delete the one or more labels 1104 of the page (e.g., see the 'x' affordance 1108 in user interface 1100). It will be appreciated that these affordances 1106 and 1108 are simply examples and the user interface 1100 may provide other mechanisms for the user to add/delete labels. For example, the label panel 1102 may include a text box to allow users to add labels. Similarly, users may be able to click on a given label and select an option to delete the label e.g., by selecting an option to do so from a drop-down menu that is displayed when a label is selected.

In one example, if the user wishes to add a label, the user selects the corresponding affordance (e.g., affordance 1106). This displays an input control along with affordances to submit one or more labels or cancel the operation. The input control may be a text box, a drop down menu, etc. Once the user adds a label and selects 'submit', the primary client 112 determines that the user wishes to update the labels associated with a displayed page.

Similarly, if the user wishes to delete a label, the user selects the 'x' affordance 1108 associated with the label the user wishes to delete. When the user makes the selection, the primary client 112 determines that the user wishes to update the labels associated with the displayed page.

In either of these cases, the primary client 112 generates and communicates a label update request to the primary server 122 at step 1202. The label update request includes the content identifier of the corresponding page, whether it is a label adding or label deleting action, and the label name/string that is to be added or deleted. In addition, the request includes the project key of the project the page belongs to and a user identifier of the principal user.

Next, at step 1204, the primary server 122 determines whether the user has permission to view the project (e.g., based on the user identifier and project key received from the primary client 112 as part of the label update request). This step is similar to step 1004 of FIG. 10.

If it is determined that the user does not have permission to view the project, the method proceeds to step 1205, where the primary server 122 generates an error message and communicates it to the primary client 112. The method 1200 thereafter end.

Alternatively, at step 1204, if it is determined that the user has permission to view the project, the method proceeds to step 1206 where the primary server 122 requests the secondary server to update the label(s). To this end, the primary server 122 may generate and communicate a label update request such as—

POST /wiki/rest/api/content/{id}/label where {id} is the content identifier of the article/blog if the update request is to add a label to the page. Alternatively, the primary server 122 may generate and communicate a request such as—

DELETE /wiki/rest/api/content/{id}/label

If the update request is to delete a label. In either event, the POST or DELETE request may further include the user identifier of the principal user.

Upon receiving this request, the secondary server 132 determines whether the user has edit permission for the space and permission to edit the page at step 1208. In one example, this is similar to step 1010 of method 1000 and therefore is not described here again.

If the secondary server 132 confirms that the user is permitted to edit the space and the page (e.g., based on verifying the received access token), the secondary server 132 updates the labels associated with the article/blog (based on the received content identifier and label data) at step 1210. That is, if the label update request was to add a new label to a page, the secondary server 132 adds the label to data associated with the page and communicates a success message to the primary product platform at step 1212. In one example, if the label is added for the page, the success message may include a response such as—

```
{
    "results": [
        {
            "prefix": "<string>",
            "name": "<string>"
            "id": "<string>",
            "label": "<string>"
        }
    ],
    "size": 2154,
}
```

In addition to the array of label names and identifiers, the response may include a field indicating the size of the labels. Alternatively, if the label update request was to delete a label from a page, the secondary product platform 130 deletes the corresponding label data at step 1210 and communicates a success message to the primary server 122 at step 1212.

At step 1214, the primary server 122 forwards the success message to the primary client 112. In one example, if the label is deleted from the page, the success message may include an empty response. Based on the content of the success message the primary client 112 updates the user interface 1110. For example, if the request was to delete an existing label, such as 'office-hardware', the primary client 112 may update the user interface 1100 to remove this label from the label panel 1102. Alternatively, if the update request was to add labels 'inkjet' and 'cartridge' to the list of labels, the user interface 1110 may be updated to show these two new labels 1104 in the label panel 1102.

In some examples, method 1200 is repeated each time a user wishes to add a new label or delete a label. In other examples, the user may be able to add multiple labels via the input control and request multiple labels to be added at the same time. In such cases, the multiple labels can be added at the same time without the need to repeat method 1200 multiple times.

Further still, in some examples, there may be restrictions around labels. For instance, there may be a constraint around the number of characters that can be used in a single label, constraints around the use of some types of special characters in label names, etc. In such cases, the method 1200 may further include steps to determine whether the label name provided by the user is valid. This check may be performed by the primary client 112 before step 1202 (i.e., before it communicates a label update request to the primary server 122) or by the secondary server 132 before step 1210 (i.e., before adding the labels). If the label names fail to match one or more label requirements such as character length, size, etc., an error message may be displayed on the client device 110 informing the user that the entered label name is not allowed. The user may be prompted to try again.

Returning to both the permission check steps of method 1200, i.e., steps 1204 and 1208, if at any one of these steps the request fails the permission checks, an error message is generated and communicated to the primary client 112 for display at step 1216. The error message may indicate that the user does not have permission to update the labels.

Permissions

Figure 13:
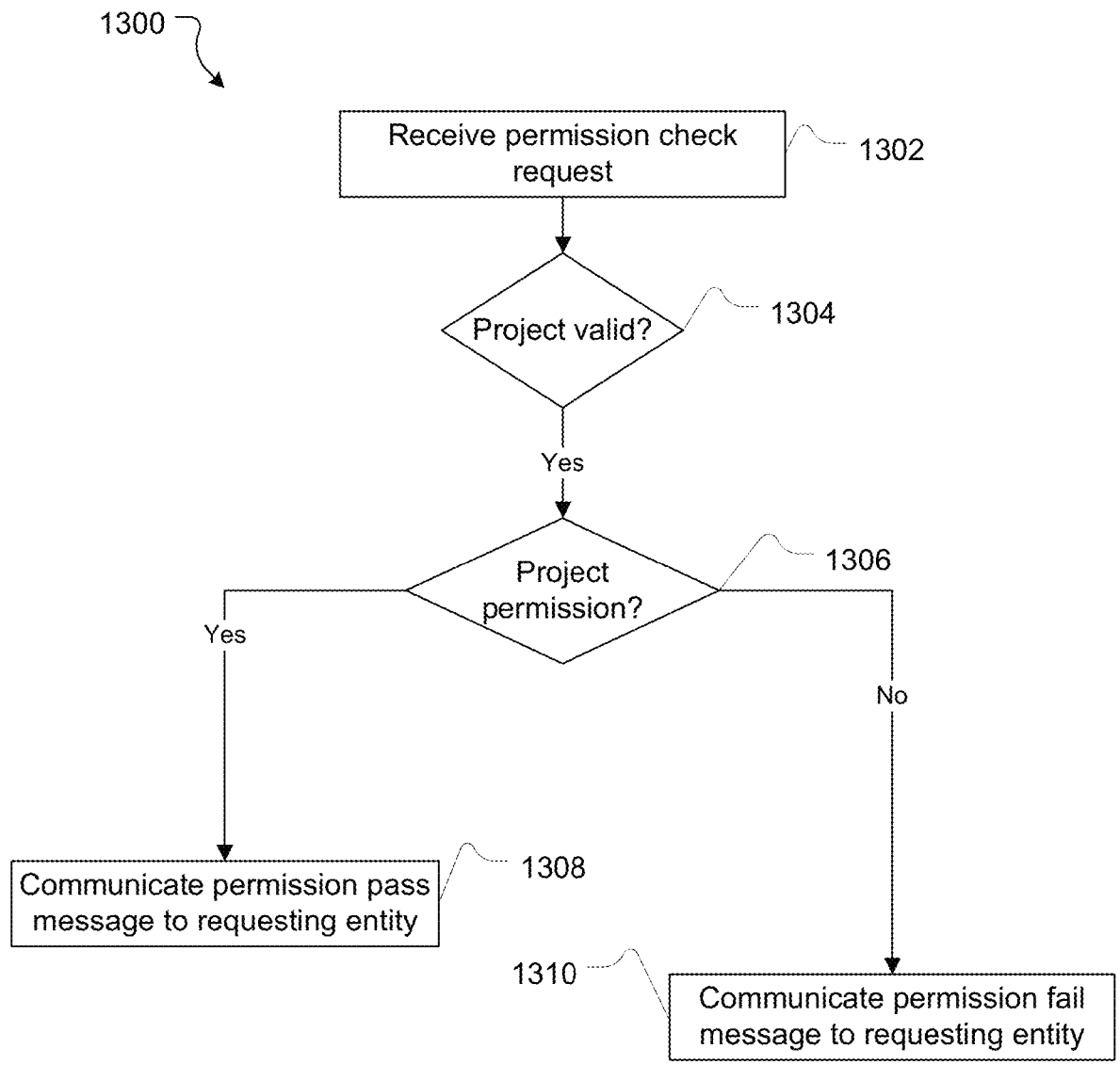
FIG. 13 is a flowchart illustrating an example method for checking primary product permissions for a user according to aspects of the present disclosure.
Figure 14:
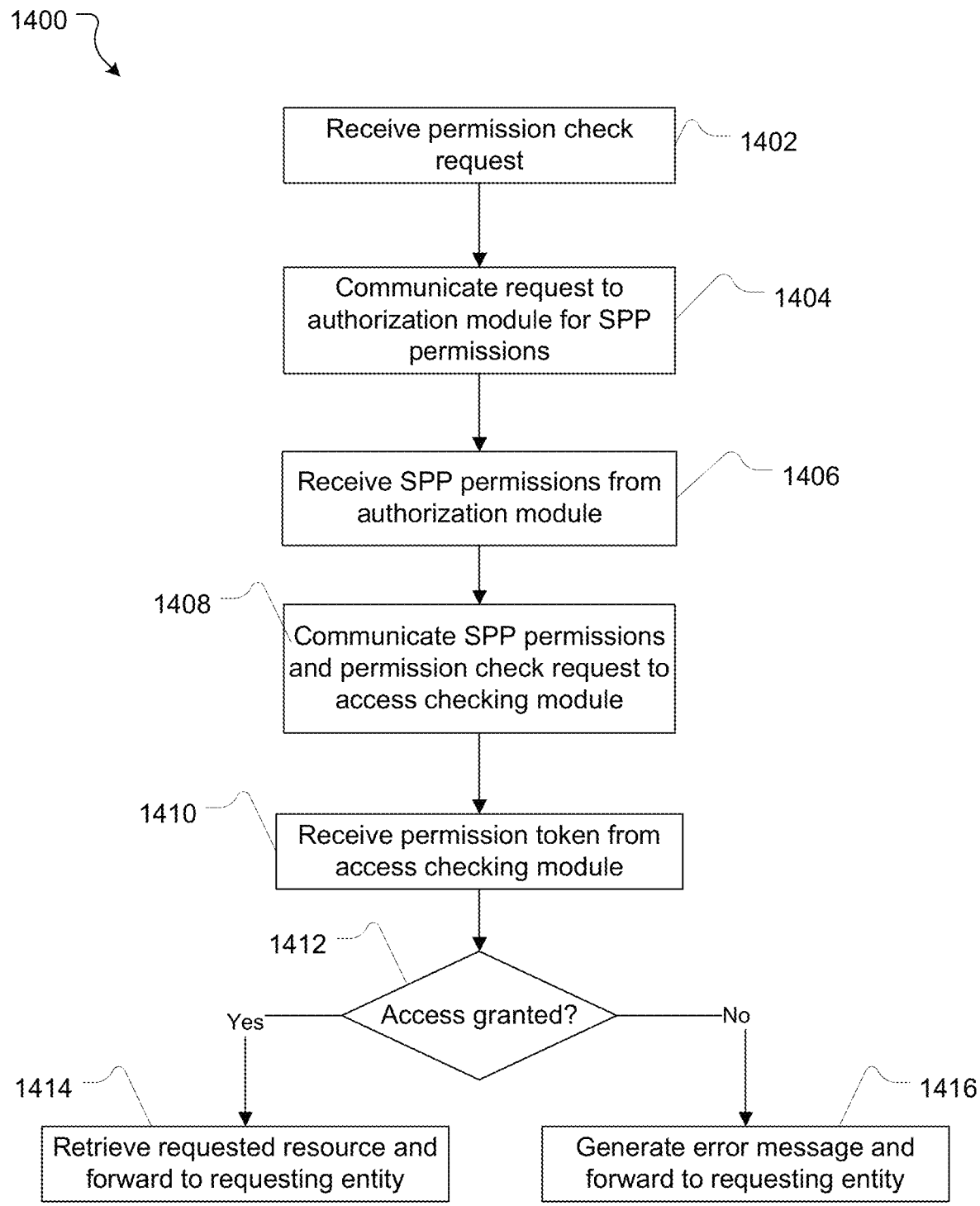
FIG. 14 is a flowchart illustrating an example method for checking secondary product permissions for a user according to aspects of the present disclosure.
Figure 15:
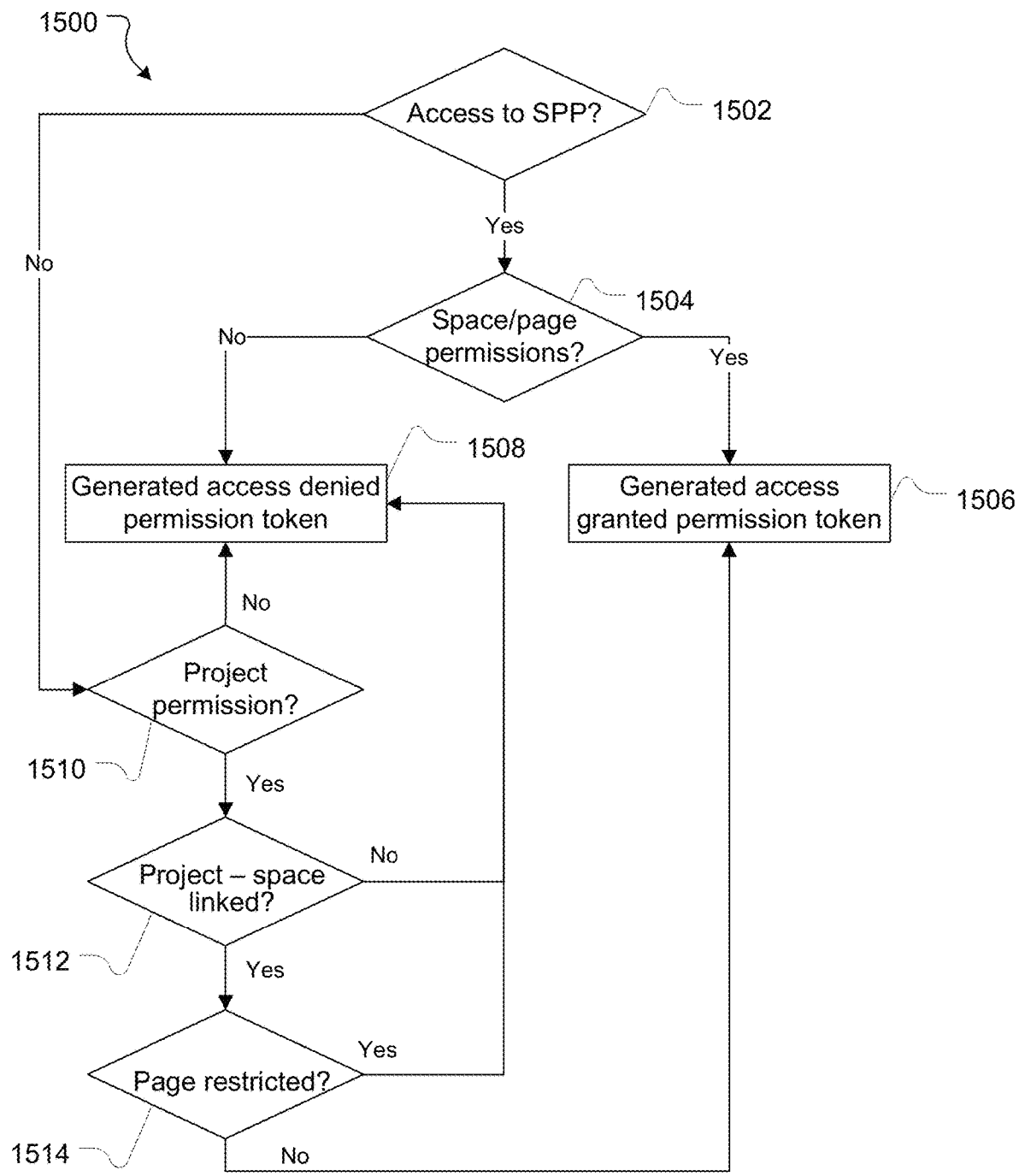
FIG. 15 is a flowchart illustrating an example method for determining whether a user has access to a resource according to aspects of the present disclosure.

The methods described above include one or more permission checks to determine whether the user has access to the primary product platform 120 and the secondary product platform 130. If the user does not have permission from either of the platforms, the corresponding methods fail—that is the user is not allowed to view, edit or create pages or labels from the primary client 112. FIGS. 13-15 illustrate example methods 1300-1500 for checking user permissions. In particular, method 1300 describes a process for determining whether a user has primary product permissions and methods 1400 and 1500 describe processes for determining whether a user has secondary product permissions.

Method 1300 is performed by the primary server 122 and in particular the permissions module 126 of the primary server 122. The method commences at step 1302 where the primary server 122 receives a permission check request. Typically, the request is received from the primary client 112 or the secondary server 132. The permission check request includes a user identifier of the principal user and a project key of a project for which user authorization is supposed to be checked.

At step 1304, the permissions module 126 determines whether the project is valid. In some examples, a project may be deleted after creation. Accordingly at step 1304, the permissions module 126 checks whether the project still exists. In some examples, the primary server 122 may maintain a list of active projects in the data store 124. The list of active projects may include a project key (e.g., a unique name of the project that is part of the project URL) and a project identifier (i.e., an identifier of the container in which the project is executed) along with other project details. At step 1304, the permissions module 126 may generate and communicate a request such as—

GET /rest/api/3/project/{projectIdOrKey} where {projectIdOrKey} is the project identifier or project key for a given project. If the project is valid, the data store 124 returns project details such as the project description, issue types associated with the project, project keys associated with the project and the project issue type hierarchy. Alternatively, if the project identifier or key is invalid, the data store 124 returns an error message indicating that the project is not found.

At step 1304, if it is determined that the project is valid, e.g., because the data store returns project details, the method proceeds to step 1306 where the permissions module 126 determines whether the principal user has access to the project. As described previously, the primary product platform 120 maintains role based permissions for administrators, agents and customers. The roles may be assigned different types of access permissions. Further, for each user of the system, the system 120 maintains data structures storing the roles assigned to the user.

In one example, at step 1306, the permissions module 126 may generate and communicate the following request to the data store 124—

POST /rest/api/3/permissions/project

This request includes the user identifier of the principal user and the type of permissions to be checked (e.g., view; edit, create, or delete). In response, the data store 124 provides a list of all projects (e.g., project identifiers and/or project keys) the user has the particular type of permissions requested to be checked. The permissions module 126 may then filter this list of returned project keys using the project key of the project validated in step 1304.

If at step 1306, the permission module 126 determines that the user has the requisite permission to view, edit, create or delete the project, e.g., because the filtered results include the project key of the validated project, the method proceeds to step 1308 where the permissions module 126 communicates a permission pass message to the requesting entity (e.g., the primary client 112 or the secondary server 132).

Alternatively, if at step 1306, the permission module 126 determines that the user does not have the requisite permission, e.g., because the filtered results are empty, the method proceeds to step 1310 where the permissions module 126 communicates a permission fail message to the requesting entity.

FIG. 14 illustrates an example method 1400 for performing a permission check in the secondary product platform 130. As described previously, the primary product has two types of users—licensed users (e.g., administrators and agents) and unlicensed users (e.g., customers). The licensed users have user accounts with both the primary product (when they register with the primary product) and the secondary product (e.g., when the two systems are silently linked using method 300). The unlicensed users of the primary product however do not have any accounts with the secondary product as they are fleeting users of the primary product. However, the secondary product is supposed to allow these unlicensed users to view pages stored on the secondary product. Accordingly, the permission check in the secondary product platform 130 includes two high-level steps—checking permissions for licensed users within the secondary product platform's data store and checking permissions for unlicensed users based on communication with the primary product platform. The authorization module 135 performs the first step—i.e., checking permissions for licensed users within the secondary product platform's data store and the access checking module performs the second step—i.e., checking permissions for unlicensed users based on communication with the primary product platform.

Method 1400 commences at step 1402 where the API module 134 of the secondary server 132 receives a permission check request. In some cases, this request may be received directly from the primary client 112 (or the embedded component, e.g., viewer/editor), e.g., in the case of methods 400, 700 or 800. In other cases, this request may be received from the primary server 122, e.g., in the case of methods 1000 and 1200. In either case, the permission check request includes a user identifier of the principal user, a space key of a space for which the permission check is requested, and a type of permission check requested (e.g., edit, view, create or delete).

At step 1404, the API module 134 communicates the permission check request to the authorization module 135 to get secondary platform related global and space permissions for the given user. The authorization module 135 is configured to communicate with the data store 133 to retrieve the global and space permissions associated with the given space. In some examples, the authorization module 135 converts the retrieved permissions into an authorization token.

An example of the contents of an authorization token are provide in table A below—

| Example authorization token |
|---|
| {<br>"aud": "Secondary Platform",<br>"nbf": 1605718532,<br>"resourceARIs": [<br>  "ari:secondaryplatform:cabc1132-f772-4d55-9600-07ec47208175:space/FFISOFF",<br>  "ari: secondaryplatform::site/cabc1132-f772-4d55-9600-07ec47208175"<br>],<br>"permissions": [<br>  "read",<br>  "manage",<br>  "create/space/personal",<br>  "create/space",<br>  "write/user/status",<br>  "read/user/profile"<br>],<br>"iss": "micros/cc-authz",<br>"principalARI": "ari:cloud:identity::user/5e314d03082f050e722340d6",<br>"exp": 1605718592,<br>"iat": 1605718532,<br>"jti": "3ce9b6cb-5aa6-49ce-9375-7183b85d0ee6"<br>} |

This example token includes a list of resources in the same hierarchy that are the object of the permission (space FFISOFF in this example) and a set of permissions granted, for the list of resources (e.g., read, manage, create spaces, write user statuses and read user profiles). In addition, the token includes the identifier of the principal user (5e314d03082f050e722340d6 in this example). The token may be encoded and signed and can be used for a given session. Once the session ends, the authorization token also expires.

Once the authorization module 135 retrieves the user permissions and creates the authorization token, it communicates this authorization token back to the API module 134 at step 1406.

The API module 134 then communicates the authorization token along with the parameters received as part of the permission check request to the access checking module 136 at step 1408.

The access checking module 136 is configured to check the secondary product permissions (by validating the authorization token) and communicate with the parent product to check permissions for unlicensed users (based on the parameters received at step 1408). Based on both these checks, the access checking module 136 is configured to generate a permission token. The permission token is designed based on the claims in the token, which include—cloud identifier, content identifier, space key, user identifier, resources, token type, and operations allowed.

In one example, the API module 134 makes a request for the permission token at step 1408 using the following command—
GET /share/embeddable/page/token The request further includes the authorization token, the space key, primary product platform name, parent product identifier and content identifier. In addition, the request may also include one or more operation type (e.g., read page, edit page, create page, create comment, etc.) for which permission needs to be checked. The operation type may be optional. If it is not provided the access checking module 136 may check for all allowed operations.

An example of the request made at step 1408 is—

| Example permission request |
|---|
| asap curl \\<br>https://cc-share.us.staging.atlpaas.net/api/v1/share/embeddable/page/token?entityIds-<br>spaceKey 223A22BT222C2022<br>parentProduct 4329abf3<br>parentProductContentContainerId 22203A202210001222C22<br>contentId 223A23080296227D' \\<br>-H 'cloudId: 9531ba3b-af0b-468f-a599-bb906830b7f6' \\<br>-H 'baseUri: https://atl-vertigo--conf-conf-proxy-jzhou2--4.jira-dev.com' \\<br>-H 'cc-authz-token: someToken' |

The response to the above command is the permission token which includes an array of allowed operations. If checking for a specific operation, the response array may be empty if the operation is not allowed or may contain a string with the operation that is allowed. If no input is specified, the array includes all the allowed operations.

Once the access checking module 136 validates the permission for the principal user it generates the permission token and returns a response to the API module 134 at step 1410. An example of the response is as follows—

| Example Permission Token |
|---|
| {<br>"validatedShareToken" : "Bearer<br>eyJraWQiOiJtaWNyb3NcL2NjLXNoYXJ1XC9wYmI4cWdpZmM2cmpwNGU3IiwiYWxnIjoiUlMyNTYi<br>fQ.eyJzcGFjZUtleSI6IlRFU1QxIiwiYXVkIjpbImNvbmZsdWVuY2UiLCJwZi1jb2xsYWItc2Vyd<br>mljZSJdLCJhbGxvd2VkT3BlcmF0aW9ucyI6WyJjcmVhdGVcL3BhZ2UiLCJyZWFkXC9zcGFjZSJdL<br>CJuYmYiOjE2MjEwMjI3MTUsImNsb3VKSWQiOiJjYWEzMGRiYi1iNjVhLTQ2YzEtODU0OC11MjI1Z<br>TkyMjlkMjAiLCJpc3MiOiJtaWNyb3NcL2NjLXNoYXJ1Iiwic291cmNlIjp7InBhcmVudFByb2R1Y<br>3RTb3VyY2VJZCI6IjEwMDAwIiwiYmFzZWybCI6ImpqenRlc3QyLmppcmEtZGV2LmNvbToONDMiL<br>CJwYXJlbnRQcm9kdWN0IjoiSlNNIn0sInRva2VuVHlwZSI6ImVtYmVKIiwiZXhwIjoxNjIxMDIyN<br>zc1LCJpYXQiOjE2MjEwMjI3MTUsImp0aSI6IjgxNDlmYTdiLTEzN2EtNDk30S1iMmY3LTVjMjk0N<br>WE2OWRkMiJ9.VCtG6XSevoKlMxlC_q-<br>lpnVOHE6tsS0OuBkPNfg9b589oaz967sD5wipwQJfAK3j5bXCvq4UreoagNz7ykDX3L_O-<br>76m8OzKzoi_58jOR4ccLNIiRLw9nHoGpTbH_O1exQjNZ-0D2uAkQ1Wg1hTd8ZCOYZIuvgTb-<br>d4c42dD9fTc5eo9f78u45JPjD16VAaAvwqn540jKj6WKj3Dv08j80mTbs7Au9FFNkVW2R7KOJ5p9<br>onTtUVRdOZc58P_pCys -<br>hpBiuXraU6DuWvh0W3KsVYgjEe3NrkWNvkLOueoenX1zU2QzcjvZnbopVp2MML950A44khAy2Zpn<br>ricciXTmw"<br>} |

Next, the API module 134 requests the data manager 137 to provide access to view/edit the page. The request includes the authorization token and the permission token. The data manager 137 then interprets the authorization and permission tokens to determine whether the requested access should be provided to the requested resource. If the data manager 137 determines that the user has the required permissions and access should be granted, it retrieves the requested resource (e.g., page or labels) and communicates it to the requesting entity (embedded component 114 or primary server 122) at step 1414. Alternatively, if at step 1412, the data manager 137 determines that the user does not have the required permissions and access should be denied, it generates an error message and communicates it to the requesting entity (embedded component 114 or primary server 122) at step 1416.

FIG. 15 illustrates an example method 1500 performed by the access checking module 136 between steps 1408 and 1410 to grant/reject permission for the principal user.

The method commences at step 1502 where the access checking module 136 determines whether the principal user has licensed access to the secondary product platform 130. To perform this check, the access checking module 136 decodes and inspects the authorization token. In particular, it checks whether the authorization token includes a value. If the principal user does not have licensed access to the secondary product platform 130, the permissions database 133 would not have any permissions for the principal user and it would return an empty array. If the decoded authorization token includes an empty array, the access checking module 136 determines that the user does not have licensed access to the secondary product platform 130. Alternatively, if the decoded token includes a non-empty array and includes the required claims, the access checking module 136 determines that the user has licensed access to the secondary product platform 130.

If at step 1502 it is determined that the principal user has licensed access to the secondary product platform 130, the method proceeds to step 1504 where the access checking module determines whether the user has space and page permissions. To this end, the access checking module 136 may once again inspect the authorization token and determine whether the resources mentioned in the authorization token correspond to the space key and content identifier received in the permission check request of step 1402. If they match, the access checking module 136 determines that the user has access to the required space and page. Alternatively, if they do not match, the access checking module 136 determines that the user does not have access to the required space and page.

If at step 1504 it is determined that the user has access to the space and page, the method proceeds to step 1506 where the access checking module 136 determines that the user has permission to view/edit the requested page and generates the permission token.

Alternatively, if at step 1504 it is determined that the user does not have access to the space and page, the method proceeds to step 1508 where the access checking module 136 determines that the user does not have permission to view/edit the requested page.

Returning to step 1502, if at this step it is determined that the principal user does not have licensed access to the secondary product platform 130 (e.g., because the authorization token has an empty array), the method proceeds to step 1510, where the access checking module 136 determines whether the principal user has primary product project permission.

In case the principal user is a customer of the primary product platform 120, the secondary product platform 130 may not have any permission data for the user (as the secondary product platform 130 does not have a corresponding account for this user). In this case, the access checking module 136 makes a call to the primary server 122 to determine whether the principal user has permission to access the primary product project. The request includes the principal user identifier and the project identifier/key.

Once the primary server 122 receives the request, it performs method 1300 to determine whether the principal user has access to the project. The response from the primary server 122 may be a simple binary output—true/yes/1 to indicate that the principal user has permission to access the corresponding project or false/no/0) to indicate that the user does not have permission to access the corresponding project.

If it is determined that the user does not have access to the primary product project (e.g., because the access checking module 136 receives a false/no/0 response from the primary server 122), the method proceeds to step 1108.

Alternatively, if it is determined that the user has access to the primary product project (e.g., because the access checking module 136 receives a true/yes/1 response from the primary server 122), the method proceeds to step 1512 where the access checking module 136 determines whether the primary product project is linked to the requested secondary product space.

As described previously, the primary server 122 maintains a data structure (e.g., table A) storing a correspondence between primary product projects and secondary product spaces. Accordingly, at this step, the access checking module 136 makes an API request to the primary server 122 to obtain a list of space keys corresponding to the project key of the previous step. If the received space keys match the space key in the permission check request of step 1402, the access checking module 136 determines that the project and space are linked. Alternatively, if it does not receive a response or if none of the received space keys match the space key received at step 1402, the access checking module 136 determines that the project and space are not linked.

If at step 1512 it is determined that the project and space are not linked the method proceeds to step 1508. Alternatively, if it is determined that the project and space are linked, the method proceeds to step 1514 where it is determined whether the secondary space and page are restricted (e.g., restricted to a group of licensed users).

To this end, the access checking module 136 may once again inspect the authorization token and determine whether the resources mentioned in the authorization token have restricted permissions. If they have restricted permissions, the method proceeds to step 1508. Alternatively, if the space and page have public access, the method proceeds to step 1506.

CLAUSES

The following numbered clauses describe additional, specific embodiments of the disclosure:

Clause 1. A computer-implemented method, comprising: receiving, at a primary client associated with a primary server, a request to interact with an object hosted by a secondary server independent of the primary server; initializing, by the primary client, an embedded component associated with the secondary server that is embedded in the primary client; and passing, by the primary client, a content identifier of the object to the embedded component, the embedded component configured to: request the secondary server to provide the object based on the content identifier; receive the object from the secondary server; and render the object for display in the primary client.

Clause 2. A method according to clause 1, wherein the embedded component is configured to receive the object from the secondary server if a user of the primary client has permission to interact with the object Clause 3. A method according to clause 1 or clause 2, wherein receiving the request to interact with the object hosted by the secondary server comprises a request to view a page hosted by the secondary server, and wherein the embedded component is an embedded viewer.

Clause 4. A method according to clause 1 or clause 2, wherein receiving the request to interact with the object hosted by the secondary server comprises a request to edit a page hosted by the secondary server, and wherein the embedded component is an embedded editor.

Clause 5. A method according to clause 4, wherein the embedded editor is configured to establish a connection with an editor service independent of the primary server and display an edit page interface on the primary client.

Clause 6. A method according to claim 5, wherein the embedded editor is further configured to: maintain the connection with the editor service; receive changes to the displayed page; communicate the received changes to the editor service; receive request to save changes; and communicate the request to the editor service, which is configured to save the changes to the page in a data store maintained by the secondary server.

Clause 7. A method of clause 1, wherein receiving the request to interact with the object hosted by the secondary server comprises receiving a page create request to create a new page to be hosted by the secondary server, and wherein the embedded component is an embedded editor.

Clause 8. A method of claim 7, further comprising: communicating, by the primary client, the page create request to the secondary server; and receiving, from the secondary server, a content identifier associated with the new page and a draft identifier associated with the new page.

Clause 9. A method of clause 8, further comprising: passing, by the primary client, the draft identifier along with the content identifier to the embedded editor.

Clause 10. The method of claim 9, wherein the embedded editor is configured to: request the secondary server to set permissions for the new page; establish a connection with an editor service independent of the primary server and display an edit page interface on the primary client; receive changes on the edit page interface; communicate the received changes to the editor service; receive a request to save the changes; and communicate the request to the editor service, which is configured to save the changes to the page in a data store maintained by the secondary server.

Clause 11. A system comprising: a processor; a non-transitory computer-readable memory storing instructions which, when executed by the processor, cause the system to perform a method according to any one of clauses 1 to 10.

Clause 12. Non-transitory storage storing instructions executable by a processor to cause the processor to perform a method according to any one of clauses 1 to 10.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

Further aspects and embodiments of the present disclosure are disclosed in the following numbered items:

1. A computer-implemented method, comprising:
   receiving, at a secondary product platform, a first permission check request for a user of a primary client, the primary client associated with a primary product platform independent of the secondary product platform, the first permission check request for performing an action on a resource maintained by the secondary product platform, the first permission check request comprising a user identifier of the user of the primary client and a resource identifier of the resource maintained by the secondary product platform;
   determining whether the user is a licensed user of the secondary product platform;
   upon determining that the user is not a licensed user of the secondary product platform, generating and communicating a second permission check request to the primary product platform, the second permission check request comprising the user identifier of the user of the primary client and a project identifier of a project of the primary product platform;
   receiving a positive indication from the primary product platform in response to the second permission check request; and
   upon receiving the positive indication from the primary product platform determining whether the project of the primary product platform is linked to a corresponding space of the secondary product platform associated with the resource; and
   granting access to the resource upon determining that the project of the primary product platform is linked to the corresponding space of the secondary product platform.

2. The computer-implemented method according to item 1, wherein determining whether the user is a licensed user of the secondary product platform comprises:
   retrieving, from a permissions database, permissions of the user based on the user identifier and generating an authorization token comprising a set of permissions granted for the space associated with the resource;
   inspecting the authorization token to determine whether the authorization token is empty or has a non-null value; and
   determining that the user is not a licensed user of the secondary product platform if the authorization token is empty.

3. The computer-implemented method according to item 1, wherein receiving the first permission check request comprises receiving the first permission check request from an embedded component associated with the secondary product platform that is executing in a primary client associated with the primary product platform.

4. The computer-implemented method according to item 1, wherein receiving the first permission check request comprises receiving the first permission check request from the primary product platform.

5. The computer-implemented method according to item 1, further comprising:
   determining whether the space and resource maintained by the secondary product platform have restricted access; and
   granting the access to the resource upon determining that the space and resource have unrestricted access.

6. The computer-implemented method according to item 2, further comprising:
   upon determining that the user is a licensed user of the secondary product platform, determining whether the user has permission to access the space and resource maintained by the secondary product platform;
   and granting access to the resource upon determining that the user has permission to access the space and the resource maintained by the secondary product platform.

7. The computer-implemented method according to 6, wherein determining whether the user has permission to access the space and resource maintained by the secondary product platform comprises inspecting the authorization token to determine whether the resource identifier received in the first permission check request matches one or more resource identifiers in the authorization token.

8. A system, comprising:
   at least one processor; and
   a non-transitory computer readable medium comprising instructions, which when executed by the at least one processor, cause the system to perform the steps of:
   receiving, at a secondary product platform, a first permission check request for a user of a primary client, the primary client associated with a primary product platform independent of the secondary product platform, the first permission check request for performing an action on a resource maintained by the secondary product platform, the first permission check request comprising a user identifier of the user of the primary client and a resource identifier of the resource maintained by the secondary product platform;
determining whether the user is a licensed user of the secondary product platform;
upon determining that the user is not a licensed user of the secondary product platform, generating and communicating a second permission check request to the primary product platform, the second permission check request comprising the user identifier of the user of the primary client and a project identifier of a project of the primary product platform;
receiving a positive indication from the primary product platform in response to the second permission check request; and
upon receiving the positive indication from the primary product platform determining whether the project of the primary product platform is linked to a corresponding space of the secondary product platform associated with the resource; and
granting access to the resource upon determining that the project of the primary product platform is linked to the corresponding space of the secondary product platform.

9. The system according to 8, wherein determining whether the user is a licensed user of the secondary product platform comprises:
retrieving, from a permissions database, permissions of the user based on the user identifier and generating an authorization token comprising a set of permissions granted for the space associated with the resource;
inspecting the authorization token to determine whether the authorization token is empty or has a non-null value; and
determining that the user is not a licensed user of the secondary product platform if the authorization token is empty.

10. The system according to item 8, wherein receiving the first permission check request comprises receiving the first permission check request from an embedded component associated with the secondary product platform that is executing in a primary client associated with the primary product platform.

11. The system according to item 8, wherein receiving the first permission check request comprises receiving the first permission check request from the primary product platform.

12. The system according to item 8, wherein the non-transitory computer readable medium further comprising instructions, which when executed by the at least one processor, cause the system to perform the steps of:
determining whether the space and resource maintained by the secondary product platform have restricted access; and
granting the access to the resource upon determining that the space and resource have unrestricted access.

13. The system according to item 8, wherein the non-transitory computer readable medium further comprising instructions, which when executed by the at least one processor, cause the system to perform the steps of:
upon determining that the user is a licensed user of the secondary product platform, determining whether the user has permission to access the space and resource maintained by the secondary product platform;
and granting access to the resource upon determining that the user has permission to access the space and the resource maintained by the secondary product platform.

14. The system according to item 13, wherein determining whether the user has permission to access the space and resource maintained by the secondary product platform comprises inspecting the authorization token to determine whether the resource identifier received in the first permission check request matches one or more resource identifiers in the authorization token.

15. A non-transitory computer-readable medium comprising instructions which when executed by at least one processor, cause the at least one processor to perform the steps of:
receiving, at a secondary product platform, a first permission check request for a user of a primary client, the primary client associated with a primary product platform independent of the secondary product platform, the first permission check request for performing an action on a resource maintained by the secondary product platform, the first permission check request comprising a user identifier of the user of the primary client and a resource identifier of the resource maintained by the secondary product platform;
determining whether the user is a licensed user of the secondary product platform;
upon determining that the user is not a licensed user of the secondary product platform, generating and communicating a second permission check request to the primary product platform, the second permission check request comprising the user identifier of the user of the primary client and a project identifier of a project of the primary product platform;
receiving a positive indication from the primary product platform in response to the second permission check request; and
upon receiving the positive indication from the primary product platform determining whether the project of the primary product platform is linked to a corresponding space of the secondary product platform associated with the resource; and
granting access to the resource upon determining that the project of the primary product platform is linked to the corresponding space of the secondary product platform.

16. The non-transitory computer-readable medium according to item 15, wherein determining whether the user is a licensed user of the secondary product platform comprises:
retrieving, from a permissions database, permissions of the user based on the user identifier and generating an authorization token comprising a set of permissions granted for the space associated with the resource;
inspecting the authorization token to determine whether the authorization token is empty or has a non-null value; and
determining that the user is not a licensed user of the secondary product platform if the authorization token is empty.

17. The non-transitory computer-readable medium according to item 15, wherein receiving the first permission check request comprises receiving the first permission check request from an embedded component associated with the secondary product platform that is executing in a primary client associated with the primary product platform.

18. The non-transitory computer-readable medium according to item 15, wherein receiving the first permission check request comprises receiving the first permission check request from the primary product platform.

19. The non-transitory computer-readable medium according to item 15, further comprising instructions, which when executed by the at least one processor, cause the at least one processor to perform the steps of:
   determining whether the space and resource maintained by the secondary product platform have restricted access; and
   granting the access to the resource upon determining that the space and resource have unrestricted access.

20. The non-transitory computer-readable medium according to item 15, further comprising instructions, which when executed by the at least one processor, cause the at least one processor to perform the steps of:
   upon determining that the user is a licensed user of the secondary product platform, determining whether the user has permission to access the space and resource maintained by the secondary product platform;
   and granting access to the resource upon determining that the user has permission to access the space and the resource maintained by the secondary product platform.

21. The non-transitory computer-readable medium according to item 15, wherein determining whether the user has permission to access the space and resource maintained by the secondary product platform comprises inspecting the authorization token to determine whether the resource identifier received in the first permission check request matches one or more resource identifiers in the authorization token.

The invention claimed is:

1. A computer-implemented method comprising:
   receiving, at a primary product server, from a primary client associated with the primary product server, a label request associated with a page hosted by a secondary product server;
   generating and communicating to the secondary product server, independent from the primary product server, a request for label data associated with the page;
   communicating a content identifier associated with the page hosted by the secondary product server and a user identifier of a user of the primary client to a secondary product platform;
   receiving, in response to the request for label data and in response to the secondary product server determining that the user of the primary client has permission to view the page hosted by the secondary product platform, one or more labels associated with the page from the secondary product server; and
   communicating the received one or more labels to the primary client for display in a user interface that includes a main panel displaying the page hosted by the secondary product server and a label panel displaying the one or more labels.

2. The computer-implemented method of claim 1, further comprising:
   receiving a user identifier and project key from the primary client along with the label request; and
   determining, by the primary product server, whether a user of the primary client has permission to view a project based on the user identifier and project key received from the primary client.

3. The computer-implemented method of claim 1 further comprising:
   receiving, at the primary product server, an access token for a user of the primary client; and
   saving the access token in a data store against a user identifier of the user of the primary client.

4. The computer-implemented method of claim 1, further comprising:
   receiving a label update request from the primary client, the label update request comprising a label action and a label string;
   communicating, from the primary product server, the label update request to the secondary product server;
   receiving confirmation from the secondary product server of updating a label and communicating the confirmation to the primary client for display on the user interface.

5. The computer-implemented method of claim 4, further comprising:
   receiving a user identifier and project key from the primary client along with the label update request; and
   determining, by the primary product server, whether a user of the primary client has permission to view a project based on the user identifier and project key received from the primary client.

6. The computer-implemented method of claim 4, further comprising:
   communicating a content identifier associated with the page hosted by the secondary product server and a user identifier of a user of the primary client to a secondary product platform; and
   receiving confirmation of updating the label from the secondary product server in response to the secondary product server determining that the user of the primary client has permission to edit the page hosted by the secondary product platform.

7. A primary product server, comprising:
   a processor;
   a non-transitory memory comprising instructions, which when executed by the processor, cause the primary product server to:
   receive from a primary client associated with the primary product server, a label request associated with a page hosted by a secondary product server;
   generate and communicate to the secondary product server, independent from the primary product server, a request for label data associated with the page;
   communicate a content identifier associated with the page hosted by the secondary product server and a user identifier of a user of the primary client to a secondary product platform;
   receive, in response to the request for label data and in response to the secondary product server determining that the user of the primary client has permission to view the page hosted by the secondary product server, one or more labels associated with the page from the secondary product server; and
   communicate the received one or more labels to the primary client for display in a user interface that includes a main panel displaying the page hosted by the secondary product server and a label panel displaying the one or more labels.

8. The primary product server of claim 7 wherein the non-transitory memory further comprising instructions, which when executed by the processor, cause the primary product server to:
   receive a user identifier and a project key from the primary client along with the label request; and
   determine whether a user of the primary client has permission to view a project based on the user identifier and project key received from the primary client.

9. The primary product server of claim 7 wherein the non-transitory memory further comprising instructions, which when executed by the processor, cause the primary product server to:
receive an access token for a user of the primary client; and
save the access token in a data store against a user identifier of the user of the primary client.

10. The primary product server of claim 7 wherein the non-transitory memory further comprising instructions, which when executed by the processor, cause the primary product server to:
receive a label update request from the primary client, the label update request comprising a label action and a label string;
communicate the label update request to the secondary product server;
receive confirmation from the secondary product server of updating a label and communicate the confirmation to the primary client for display on the user interface.

11. The primary product server of claim 10 wherein the non-transitory memory further comprising instructions, which when executed by the processor, cause the primary product server to:
receive a user identifier and project key from the primary client along with the label update request; and
determine whether a user of the primary client has permission to view a project based on the user identifier and project key received from the primary client.

12. The primary product server of claim 10 wherein the non-transitory memory further comprising instructions, which when executed by the processor, cause the primary product server to:
communicate a content identifier associated with the page hosted by the secondary product server and a user identifier of a user of the primary client to a secondary product platform; and
receive confirmation of updating the label from the secondary product server in response to the secondary product server determining that the user of the primary client has permission to edit the page hosted by the secondary product platform.

13. Non-transitory computer-readable medium comprising instructions executable by a processor to cause the processor to:
receive from a primary client associated with a primary product server, a label request associated with a page hosted by a secondary product server;
generate and communicate to the secondary product server, independent from the primary product server, a request for label data associated with the page;
communicate a content identifier associated with the page hosted by the secondary product server and a user identifier of a user of the primary client to a secondary product platform;
receive, in response to the request for label data and in response to the secondary product server determining that the user of the primary client has permission to view the page hosted by the secondary product platform, one or more labels associated with the page from the secondary product server; and
communicate the received one or more labels to the primary client for display in a user interface that includes a main panel displaying the page hosted by the secondary product server and a label panel displaying the one or more labels.

14. The non-transitory computer-readable medium of claim 13, further comprising instructions executable by a processor to cause the processor to:
receive a user identifier and project key from the primary client along with the label request; and
determine, by a primary product server, whether a user of the primary client has permission to view a project based on the user identifier and project key received from the primary client.

15. The non-transitory computer-readable medium of claim 13, further comprising instructions executable by a processor to cause the processor to:
receive an access token for a user of the primary client; and
save the access token in a data store against a user identifier of the user of the primary client.

16. The non-transitory computer-readable medium of claim 13, further comprising instructions executable by a processor to cause the processor to:
receive a label update request from the primary client, the label update request comprising a label action and a label string;
communicate the label update request to the secondary product server;
receive confirmation from the secondary product server of updating a label and communicating the confirmation to the primary client for display on the user interface.

17. The non-transitory computer-readable medium of claim 16, further comprising instructions executable by a processor to cause the processor to:
communicate a content identifier associated with the page hosted by the secondary product server and a user identifier of a user of the primary client to a secondary product platform; and
receive confirmation of updating the label from the secondary product server in response to the secondary product server determining that the user of the primary client has permission to edit the page hosted by the secondary product platform.

\* \* \* \* \*